(12) United States Patent
Asakawa et al.

(10) Patent No.: US 12,107,243 B2
(45) Date of Patent: Oct. 1, 2024

(54) BATTERY PACK

(71) Applicant: MINEBEA MITSUMI Inc., Nagano (JP)

(72) Inventors: Toshiaki Asakawa, Shizuoka (JP); Shigeyuki Adachi, Shizuoka (JP); Eiji Misaizu, Kanagawa (JP); Atsushi Kitamura, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 773 days.

(21) Appl. No.: 17/271,000

(22) PCT Filed: Aug. 28, 2019

(86) PCT No.: PCT/JP2019/033710
§ 371 (c)(1),
(2) Date: Mar. 23, 2021

(87) PCT Pub. No.: WO2020/045499
PCT Pub. Date: Mar. 5, 2020

(65) Prior Publication Data
US 2021/0328278 A1    Oct. 21, 2021

(30) Foreign Application Priority Data

Aug. 28, 2018  (JP) .................. 2018-159658
Dec. 21, 2018  (JP) .................. 2018-239997

(51) Int. Cl.
*H01M 50/213*  (2021.01)
*G01B 7/16*    (2006.01)
(Continued)

(52) U.S. Cl.
CPC ............ *H01M 10/482* (2013.01); *G01B 7/16* (2013.01); *G01L 1/22* (2013.01); *H01M 10/425* (2013.01);
(Continued)

(58) Field of Classification Search
CPC ............ H01M 50/528; H01M 50/543; H01M 50/213; H01M 10/482; G01B 7/16
See application file for complete search history.

(56) References Cited

U.S. PATENT DOCUMENTS 5,914,168 A   6/1999  Wakamatsu et al.
6,623,883 B1  9/2003  Kise et al.
(Continued)

FOREIGN PATENT DOCUMENTS

CA   2525669   11/2004
EP   0725392   8/1996
(Continued)

OTHER PUBLICATIONS

Office Action mailed on May 25, 2021 with respect to the corresponding Japanese Patent Application No. 2018-239997.
(Continued)

*Primary Examiner* — Kenneth J Douyette
(74) *Attorney, Agent, or Firm* — IPUSA, PLLC

(57) ABSTRACT

A battery pack includes a battery, a sensor configured to detect a state of the battery. The sensor includes an insulating layer, and a resistor on one side of the insulating layer, the resistor being formed of a Cr composite film. The sensor detects the state of the battery as a change in a resistance value of the resistor.

13 Claims, 16 Drawing Sheets

(51) Int. Cl.
*G01L 1/22* (2006.01)
*H01M 10/42* (2006.01)
*H01M 10/48* (2006.01)
*H01M 50/528* (2021.01)
*H01M 50/543* (2021.01)

(52) U.S. Cl.
CPC ....... *H01M 10/486* (2013.01); *H01M 50/213* (2021.01); *H01M 50/528* (2021.01); *H01M 50/543* (2021.01)

(56) References Cited

U.S. PATENT DOCUMENTS

| | | | |
|---|---|---|---|
| 7,921,727 | B2 | 4/2011 | Rice |
| 2006/0081062 | A1* | 4/2006 | Silverbrook ........ B60C 23/0408 73/754 |
| 2012/0126991 | A1 | 5/2012 | Cassidy |
| 2014/0042961 | A1 | 2/2014 | Lan |
| 2014/0186716 | A1 | 7/2014 | Wu et al. |
| 2015/0001650 | A1* | 1/2015 | Matsunami ........... G01L 9/0055 438/51 |
| 2015/0160302 | A1 | 6/2015 | Xu et al. |
| 2016/0082467 | A1 | 3/2016 | Mikami et al. |
| 2017/0098872 | A1 | 4/2017 | Sood et al. |
| 2017/0324122 | A1 | 11/2017 | Poirier et al. |
| 2018/0040920 | A1 | 2/2018 | Takatsuka et al. |
| 2018/0172527 | A1 | 6/2018 | Kim et al. |

FOREIGN PATENT DOCUMENTS

| | | |
|---|---|---|
| JP | H06-300649 | 10/1994 |
| JP | H07-306002 | 11/1995 |
| JP | H08-102163 | 4/1996 |
| JP | H09-016941 | 1/1997 |
| JP | 2002-289265 | 10/2002 |
| JP | 2004-179085 | 6/2004 |
| JP | 2007-173544 | 7/2007 |
| JP | 2012-114078 | 6/2012 |
| JP | 2013-098031 | 5/2013 |
| JP | 2014-035239 | 2/2014 |
| JP | 2014-074661 | 4/2014 |
| JP | 2015-031633 | 2/2015 |
| JP | 2016-076335 | 5/2016 |
| JP | 2016-136605 | 7/2016 |
| JP | 2017-101983 | 6/2017 |
| KR | 10-2014-0020375 | 2/2014 |
| WO | 2007/061928 | 5/2007 |
| WO | 2016/143400 | 9/2016 |

OTHER PUBLICATIONS

Extended European Search Report mailed on Aug. 2, 2022 with respect to the corresponding European patent application No. 19854127.8.

International Search Report for PCT/JP2019/033710 mailed on Nov. 19, 2019.

Office Action mailed on Aug. 9, 2022 with respect to the corresponding Japanese patent application No. 2021-155551.

Partial Supplementary European Search Report dated mailed May 10, 2022 with respect to the corresponding European patent application No. 19854127.8.

Office Action mailed on Feb. 4, 2024 issued with respect to the corresponding Chinese patent application No. 201980067832.6.

* cited by examiner

BATTERY PACK

TECHNICAL FIELD

The present invention relates to a battery pack.

BACKGROUND

In battery packs used in mobile devices or the like, there is a case where batteries expand and are caused to leak when a battery life of batteries in a battery pack is reduced or the like. Thus, in battery packs, it is important to detect expansion of batteries, and various devices that detect expansion of batteries have been proposed.

One example is a device that detects internal pressure by using a strain gauge placed in an inner space of a lithium secondary battery and that displays the detected internal pressure on a display. In this device, by monitoring the displayed internal pressure, it can be determined whether the lithium secondary battery is normal or abnormal (see, for example, Patent Document 1).

CITATION LIST

Patent Document

[Patent document 1] Japanese Unexamined Patent Application Publication No. 2002-289265

SUMMARY

Problem to be Solved by the Invention

However, it is difficult to accurately detect expansion of batteries by using previously proposed devices. Additionally, there is a need to accurately detect various states of batteries (e.g., battery contraction) in addition to battery expansion.

The present invention is made in view of the above points, and it is an object to provide a battery pack that accurately detects states of batteries.

Means for Solving Problem

A battery pack includes a battery and a sensor that detects a state of the battery, wherein the sensor includes an insulating layer and a resistor formed of a Cr composite film on one side of the insulating layer, and detects the state of the battery as a change in a resistance value of the resistor.

Effects of the Invention

According to the disclosed technique, a battery pack that accurately detects a state of a battery can be provide.

DESCRIPTION OF EMBODIMENTS

In the following, embodiments of the invention will be described with reference to the drawings. In each drawing, the same components are referenced by the same reference signs and duplicate descriptions may be omitted.

In the following embodiments and modified examples, examples of detecting expansion of a battery are described. However, the embodiments are not limited to these, and a strain gauge or a sensor according to the embodiments and the modified examples can detect various states of the battery. Various states of the battery include, for example, contraction of the battery, presence or absence of convex or concave parts, shape distribution, the temperature, and the like, in addition to expansion of the battery.

First Embodiment

Figure 1:
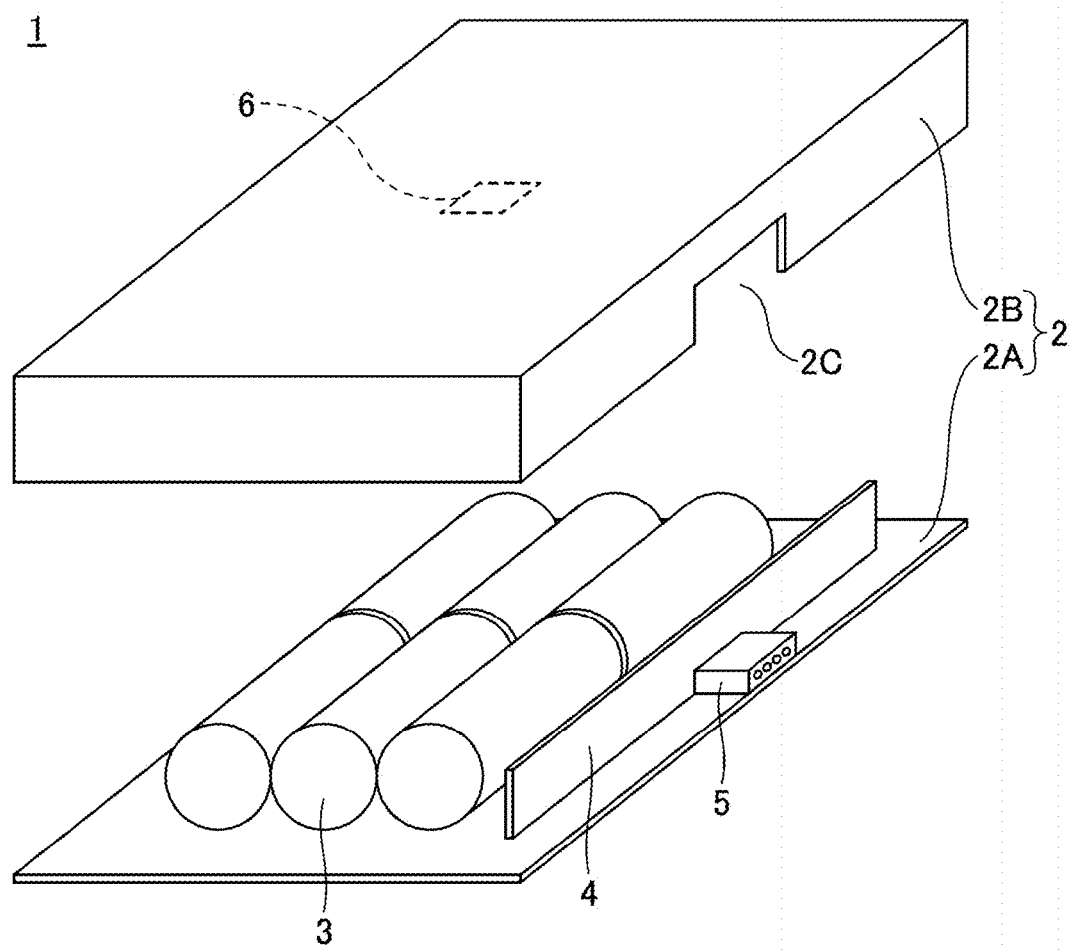
FIG. 1 is an exploded perspective view illustrating an example of a battery pack according to a first embodiment.

FIG. 1 is an exploded perspective view illustrating an example of a battery pack according to a first embodiment. With reference to FIG. 1, a battery pack 1 includes a housing 2, multiple batteries 3, a circuit board 4, an external output terminal 5, and a strain gauge 6. The battery pack 1 can be used in a wide variety of electronic devices, portable terminals, and the like, such as personal computers and smartphones.

The housing 2 is a member that accommodates the battery 3, the circuit board 4, and the external output terminal 5, and includes a lower member 2A and an upper member 2B that are formed of, for example, resin. The battery 3 is, for example, a secondary battery, such as a lithium-ion battery, and multiple batteries 3 are appropriately connected in parallel and/or in series and are arranged on the lower member 2A. Although FIG. 1 illustrates six batteries 3, the number of the batteries 3 can be appropriately determined as necessary.

The circuit board 4 is a board for implementing the external output terminal 5 and an electronic component (which is not illustrated), and is fixed on the lower member 2A. The external output terminal 5 is a connector for connecting the battery pack 1 to an external device or the like and is implemented on the circuit board 4. The external output terminal 5 may appropriately include a terminal that outputs the voltage of the battery 3, a terminal that outputs a detection result of the strain gauge 6, a terminal used to charge the battery 3, and the like.

The strain gauge 6 is a sensor that detects expansion of the battery 3 (presence or absence of expansion of the battery 3 or degree of expansion of the battery 3). For example, the strain gauge 6 is attached to an inner surface of the upper member 2B. However, the strain gauge 6 may be placed at any position suitable for detecting the degree of expansion of the battery 3. The strain gauge 6 may be embedded in the lower member 2A or the upper member 2B.

Here, FIG. 1 is an exploded perspective view. The upper member 2B is fixed to accommodate the batteries 3, the circuit board 4, and the external output terminal 5 on the lower member 2A, and then the battery pack 1 is completed. In the upper member 2B, a cutout part 20 that exposes a part of the external output terminal 5 to the outside of the housing 2 is provided.

In the battery pack 1, the voltage of the battery 3 can be output from the external output terminal 5. The battery 3 can be charged by an external charging device through the external output terminal 5. Information detected by the strain gauge (information indicating the degree of expansion of the battery 3) can be output from the external output terminal 5.

Figure 2:
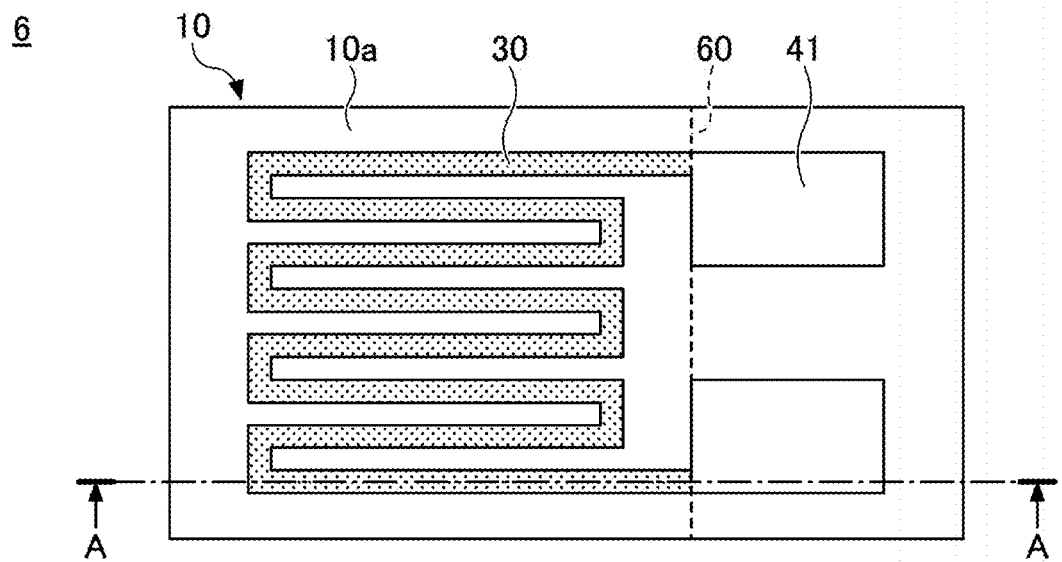
FIG. 2 is a plan view illustrating an example of a strain gauge mounted to the battery pack according to the first embodiment.
Figure 3:
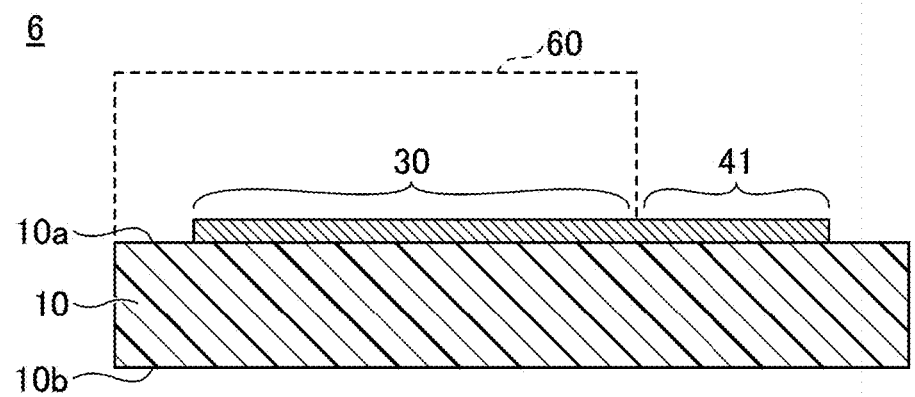
FIG. 3 is a cross-sectional view (part 1) illustrating the example of the strain gauge mounted to the battery pack according to the first embodiment.

FIG. 2 is a plan view illustrating an example of the strain gauge mounted on the battery pack according to the first embodiment. FIG. 3 is a cross-sectional view illustrating the example of the strain gauge mounted on the battery pack according to the first embodiment, and illustrates a cross-section along the line A-A in FIG. 2. With reference to FIG. 2 and FIG. 3, the strain gauge 6 includes a substrate 10, a resistor 30, and terminal sections 41. The strain gauge 6 may, for example, be attached to the inner surface of the upper member 2B of the housing 2 by applying an adhesive to a lower surface 10b of the substrate 10.

Note that in the present embodiment, for the purpose of convenience, in the strain gauge 6, a side of the substrate 10 where the resistor 30 is provided is referred to as an upper side or one side, and a side of the substrate 10 where the resistor 30 is not provided is referred to as a lower side or another side. Additionally, for each component, a surface on the side where the resistor 30 is provided is referred to as one surface or an upper surface, and a surface on the side where the resistor 30 is not provided is referred to as another surface or a lower surface. However, the strain gauge 6 can be used in a state of being upside down, or can be disposed at any angle. Further, a plan view indicates that an object is viewed from a direction normal to an upper surface 10a of the substrate 10, and a planar shape indicates a shape of an object viewed from the direction normal to the upper surface 10a of the substrate 10.

The substrate 10 is an insulating member that is a base layer for forming the resistor 30 or the like and is flexible. The thickness of the substrate 10 is not particularly limited, and can be appropriately selected depending on a purpose. For example, the thickness can be approximately between 5 μm and 500 μm. In particular, if the thickness of the substrate 10 is between 5 μm and 200 μm, it is preferable in terms of reducing variations in strain sensitivity of the resistor 30.

The substrate 10 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Note, however, that when the substrate 10 is not required to have flexibility, a material such as $SiO_2$, $ZrO_2$ (including YSZ), Si, $Si_3N_4$, $Al_2O_3$ (including sapphire), ZnO, perovskite-based ceramics ($CaTiO_3$, $BaTiO_3$), or the like may be used for the substrate 10.

The resistor 30 is a thin film formed on the substrate 10 in a predetermined pattern and is a sensitive element causing a resistance change in response to receiving the strain. The resistor 30 may be formed directly on the upper surface 10a of the substrate 10 or may be formed through another layer on the upper surface 10a of the substrate 10. In FIG. 2, for the purpose of convenience, the resistor 30 is illustrated in a dotted pattern.

The resistor 30 can be formed of, for example, material including Cr (chromium), material including Ni (nickel), or material including both of Cr and Ni. In other words, the resistor 30 can be formed of material including at least one among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, Cr2N, and the like. The Cr composite film may include incidental impurities such as chromium oxide.

The thickness of the resistor 30 is not particularly limited, and can be appropriately selected depending on a purpose. The thickness can be, for example, approximately between 0.05 μm and 2 μm. In particular, if the thickness of the resistor 30 is 0.1 μm or more, it is preferable in terms of improvement in crystallinity (e.g., crystallinity of α-Cr) of a crystal that constitutes the resistor 30. If the thickness of the resistor 30 is 1 μm or less, it is further preferable in terms of reduction in cracks of a film caused by internal stress of the film that constitutes the resistor 30, or reduction in warp in the substrate 10.

For example, if the resistor 30 is a Cr composite film, the stability of the gauge characteristic can be improved by using alpha chromium (α-Cr), which is a stable crystalline phase, as a main component. Further, the resistor 30 includes α-Cr as the main component, so that a gauge factor of the strain gauge 6 can be 10 or more, and a temperature coefficient of gauge sensitivity TCS and a temperature coefficient of resistance TCR can be within the range of −1000 ppm/° C. to +1000 ppm/° C. Here, the main component indicates that a target material occupies 50% by weight or more in all materials constituting the resistor. However, from the viewpoint of improving the gauge characteristic, the resistor 30 preferably includes 80% by weight or more of α-Cr. Here, α-Cr is Cr having a body-centered cubic (bcc) structure.

The terminal section 41 extends from each end portion of the resistor 30, and is formed wider than the resistor 30 and substantially rectangular in a planar view. The terminal sections 41 are a pair of electrodes for externally outputting a change in a resistance value of the resistor 30 caused by strain, and is bonded to, for example, a flexible board, a lead wire, or the like for external connection.

The resistor 30, for example, extends from one terminal section 41 in a zigzag to connect to the other terminal section 41. An upper surface of the terminal section 41 may be coated with a metal having better solderability than the terminal section 41. For the purpose of convenience, the resistor 30 and the terminal section 41 are referenced by different reference signs. However, both may be integrally formed of the same material in the same process.

To cover the resistor 30 and expose the terminal sections 41, a cover layer 60 (i.e., an insulating resin layer) may be provided on the upper surface 10a of the substrate 10. Providing the cover layer 60 prevents mechanical damage or the like from occurring on the resistor 30. Additionally, providing the cover layer 60 can protect the resistor 30 from moisture or the like. The cover layer 60 may be provided to cover an entirety except the terminal sections 41.

The cover layer 60 can be formed of an insulating resin such as a PI resin, an epoxy resin, a PEEK resin, a PEN resin, a PET resin, a PPS resin, or a composite resin (e.g., a silicone resin or a polyolefin resin). The cover layer 60 may contain fillers or pigments. The thickness of the cover layer 60 is not particularly limited, and can be appropriately selected depending on a purpose. For example, the thickness may be approximately between 2 μm and 30 μm.

When the battery 3 expands in the battery pack 1, the lower member 2A and the upper member 2B are deformed accordingly. The strain gauge 6 can detect expansion of the battery 3 (i.e., a presence or absence of expansion of the battery 3, and the degree of expansion) as a change in the resistance value of the resistor 30 and output a result from the terminal sections 41 that are a pair of electrodes.

If the battery 3 expands, the resistor 30 of the strain gauge 6 becomes thin and long, so that the resistance value increases. If the battery 3 contracts, the resistor of the strain gauge 6 becomes thick and short, so that the resistance value decreases. Thus, by monitoring the increase and decrease of the resistance value of the resistor of the strain gauge 6, it can be determined whether the battery 3 expands or contracts.

In order to manufacture the strain gauge 6, the substrate 10 is first prepared and the planar resistor 30 and the terminal sections 41 illustrated in FIG. 2 are formed on the upper surface 10a of the substrate 10. The material and the thickness of the resistor 30 and the terminal sections 41 are as described above. The resistor 30 and the terminal sections 41 may be integrally formed of the same material.

The resistor 30 and the terminal sections 41 can be formed by, for example, depositing using magnetron sputtering in which a raw material suitable as the resistor 30 and the terminal sections 41 is targeted, and patterning by using photolithography. Instead of magnetron sputtering, the resistor 30 and the terminal sections 41 may be deposited by reactive sputtering, vapor deposition, arc ion plating, pulsed laser deposition, or the like.

From the viewpoint of achieving the stability of the gauge characteristics, before depositing the resistor 30 and the terminal sections 41, as a base layer, a functional layer having a film thickness of about 1 nm to 100 nm is preferably vacuum-deposited on the upper surface 10a of the substrate 10, for example, by conventional sputtering. After the resistor 30 and the terminal sections 41 are formed over the entire upper surface of the functional layer, the functional layer is patterned in the planar shape illustrated in FIG. 2 by photolithography together with the resistor 30 and the terminal sections 41.

In the present application, the functional layer refers to a layer that has at least a function of promoting crystal growth of the resistor 30 that is an upper layer. The functional layer preferably further has a function of preventing oxidation of the resistor 30 caused by oxygen and moisture included in the substrate 10, and a function of improving adhesion between the substrate 10 and the resistor 30. The functional layer may further have another function.

The insulating resin film constituting the substrate 10 contains oxygen and moisture. Thus, particularly when the resistor 30 includes Cr, it is effective for the functional layer to have a function of preventing oxidation of the resistor 30, because Cr forms a self-oxidized film.

The material of the functional layer is not particularly limited as long as it is material having at least a function of promoting crystal growth of the resistor 30 that is an upper layer. Such material can be appropriately selected depending on a purpose, and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals among the group; or a compound of any metal among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is targeted and an Ar (argon) gas is supplied to a chamber. With use of conventional sputtering, the functional layer is deposited while the upper surface 10a of the substrate 10 is etched with Ar. Thus, the deposited amount of a film of the functional layer is minimized and thus the effect of improved adhesion can be obtained.

However, this is an example of a method of depositing the functional layer, and the functional layer may be formed by other methods. For example, as such a method, before depositing the functional layer, the upper surface 10a of the substrate 10 may be activated by plasma treatment such as plasma treatment using Ar or the like, to thereby obtain the effect of improved adhesion. Subsequently, the functional layer may be vacuum-deposited by magnetron sputtering.

A combination of the material of the functional layer, and the material of the resistor 30 and the terminal sections 41 is not particularly limited, and can be appropriately selected depending on a purpose. For example, Ti is used for the functional layer, and a Cr composite film, having α-Cr (alpha-chromium) as a main component, can be deposited as the resistor 30 and the terminal sections 41.

In this case, the resistor 30 and the terminal sections 41 can be deposited by, for example, magnetron sputtering in which a raw material capable of forming the Cr composite film is targeted and an Ar gas is introduced to a chamber. Alternatively, the resistor 30 and the terminal sections 41 may be deposited by reactive sputtering in which pure Cr is targeted and an appropriate amount of nitrogen gas, as well as an Ar gas, are introduced to a chamber.

In such methods, a growth surface of the Cr composite film is defined by the functional layer formed of Ti, and a Cr composite film that has α-Cr having a stable crystalline structure as the main component can be deposited. Also, Ti constituting the functional layer is diffused into the Cr composite film, so that the gauge characteristic is improved. For example, the gauge factor of the strain gauge 6 may be 10 or more, and the temperature coefficient of gauge sensitivity TCS and the temperature coefficient of resistance TCR may be within the range from −1000 ppm/° C. to +1000 ppm/° C. Here, when the functional layer is formed of Ti, Ti or TiN (titanium nitride) may be included in the Cr composite film.

Note that when the resistor 30 is the Cr composite film, the functional layer formed of Ti includes the functions of promoting crystal growth of the resistor 30, preventing oxidation of the resistor 30 caused by oxygen or moisture contained in the substrate 10, and improving adhesion between the substrate 10 and the resistor 30. The same applies to a case where the functional layer is formed of Ta, Si, Al, or Fe, instead of Ti.

As described above, by providing the functional layer in the lower layer of the resistor 30, crystal growth of the resistor 30 can be promoted and thus the resistor 30 having a stable crystalline phase can be fabricated. As a result, in the strain gauge 6, the stability of the gauge characteristic can be improved. Also, in the strain gauge 6, the gauge characteristic can be improved by the material constituting the functional layer being diffused into the resistor 30.

After forming the resistor 30 and the terminal sections 41, the strain gauge 6 is completed by providing the cover layer 60 on the upper surface 10a of the substrate 10 to cover the resistor 30 and expose the terminal sections 41, if necessary. The cover layer 60 can be made, for example, by laminating, heating, and curing a thermosetting insulating resin film in a semi-cured state so as to cover the resistor 30 and expose the terminal sections 41 on the upper surface 10a of the substrate 10. The cover layer 60 may be made by applying a thermosetting insulating resin that is liquid or paste-like to the upper surface 10a of the substrate 10 to cover the resistor 30 and expose the terminal sections 41, and then heating and curing the thermosetting insulating resin.

Figure 4:
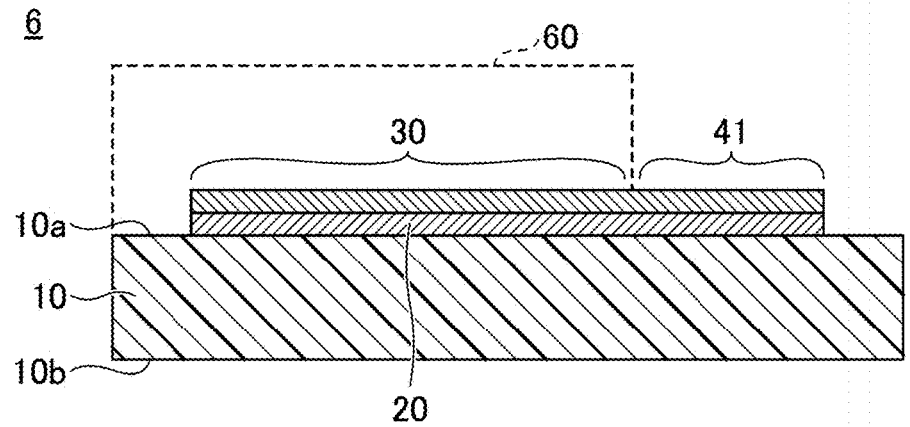
FIG. 4 is a cross-sectional view (part 2) illustrating the example of the strain gauge mounted to the battery pack according to the first embodiment.

If the functional layer is provided on the upper surface 10a of the substrate 10 as a base layer of the resistor 30 and the terminal sections 41, the strain gauge 6 has the cross-sectional shape illustrated in FIG. 4. The layer referenced by the reference sign 20 is the functional layer. A planar shape of the strain gauge 6 when the functional layer 20 is provided is the same as that in FIG. 2.

Figure 5:
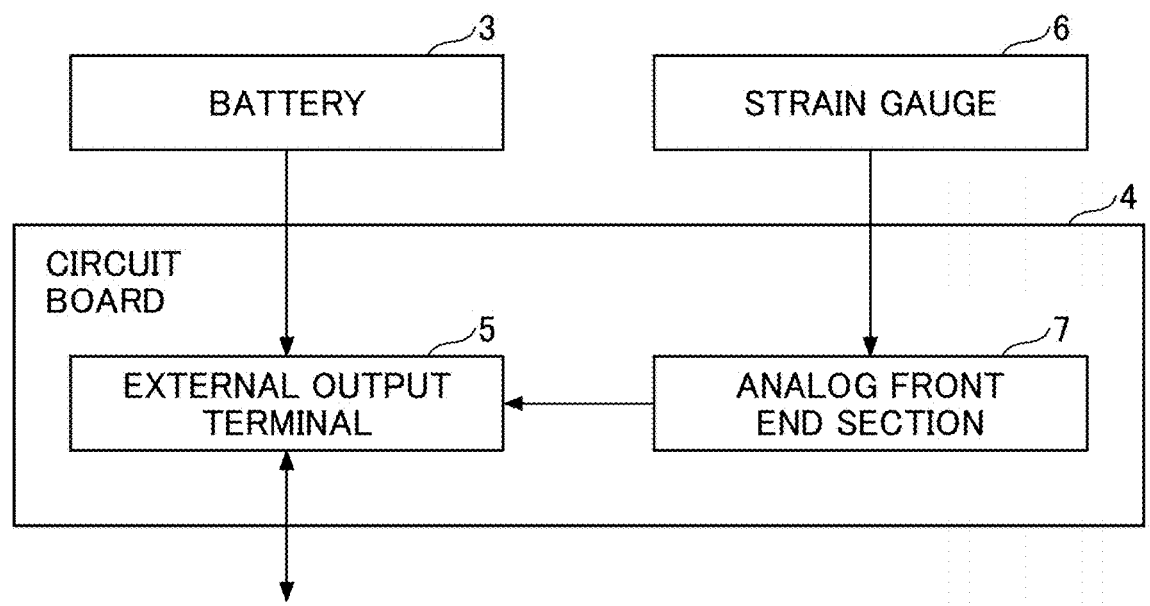
FIG. 5 is a block diagram for describing a circuit board mounted to the battery pack according to the first embodiment.

FIG. 5 is a block diagram for describing a circuit board mounted on the battery pack according to the first embodiment. With reference to FIG. 5, the strain gauge 6 is connected to an analog front end section 7 implemented in the circuit board 4, and an output of the analog front end section 7 is connected to the external output terminal 5. Therefore, the information detected by the strain gauge 6 (i.e., information indicating the degree of expansion of the battery 3) can be output from the external output terminal 5 as a digital signal.

Here, to the circuit board 4, a circuit (such as an electronic component) having another function may be mounted. The circuit having another function is, for example, a voltage monitoring circuit, a protection circuit, a current detection circuit, and the like, of the battery 3.

The pair of terminal sections 41 of the strain gauge 6 are connected to the analog front end section 7 using, for example, a flexible substrate, a lead wire, or the like.

The analog front end section 7 includes, for example, a bridge circuit, an amplifier, an analog/digital conversion circuit (i.e., an A/D conversion circuit), and an external communication function (e.g., a serial communication function such as I$^2$C). The analog front end section 7 may include a temperature compensation circuit. The analog front end section 7 may be IC or formed of separate components.

In the analog front end section 7, for example, the pair of terminal sections 41 of the strain gauge 6 are connected to the bridge circuit. That is, one side of the bridge circuit is formed of the resistor 30 between the pair of terminal sections 41, and the other three sides are formed of fixed resistances. Thus, a voltage (i.e., an analog signal) corresponding to a resistance value of the resistor 30 can be obtained as an output of the bridge circuit.

The voltage output from the bridge circuit is amplified by the amplifier, and then converted into a digital signal by the A/D conversion circuit, so that the voltage output from the bridge circuit can be output from the external output terminal 5. If the analog front end section 7 includes the temperature compensation circuit, a digital signal on which the temperature compensation is performed can be output from the external output terminal 5.

For example, in the battery pack 1, a case may occur in which the battery 3 expands, causes a liquid leakage, and the like due to a decrease in life of the battery 3, or the like. Thus, in the battery pack 1, expansion of the battery 3 is detected by the strain gauge 6, and a detection result (i.e., information indicating the degree of expansion of the battery 3) is output from the external output terminal 5 as a digital signal from the analog front end section 7.

For example, outside of the battery pack 1, a charging circuit can be connected to the external output terminal 5. In this case, the connected charging circuit can increase or decrease the charging current based on the digital signal from the analog front end section 7. Additionally, the connected charging circuit can stop charging and emit a warning sound or display a "non-rechargeable" if it is determined that the degree of expansion of the battery 3 exceeds an allowable value.

Additionally, inside the battery pack 1, a control circuit, including a central processing unit (CPU) or the like, can be provided. The control circuit may be mounted, for example, on the circuit board 4. In this case, for example, a current interrupt switch is inserted into a line on the positive and/or negative side of the battery 3, and a digital signal output from the analog front end section 7 is input to the control circuit. The control circuit can shut off the current interruption switch and stop an operation of the battery pack 1 if it is determined that the degree of expansion of the battery 3 exceeds the allowable value based on the digital signal from the analog front end section 7.

As described, in the battery pack 1, by providing the strain gauge 6, the degree of expansion of the battery 3 can be detected as a change in the resistance value of the resistor 30. This can control an amount of charging current in accordance with the degree of expansion of the battery 3 or can stop the operation of the battery pack 1. As a result, if the degree of expansion of the battery 3 exceeds the allowable value, the battery can be prevented from being forced to charge or from being continuously used, thereby avoiding damage to the battery pack 1 and improving the safety of the battery pack 1.

In particular, if the resistor 30 is formed of a Cr composite film, the sensitivity of the resistance value to the expansion of the battery 3 (i.e., a change amount of the resistance value of the resistor 30 relative to the expansion amount of the battery 3) is significantly improved, in comparison with a case in which the resistor 30 is formed of Cu—Ni or Ni—Cr. If the resistor 30 is formed of a Cr composite film, the sensitivity of the resistance value relative to expansion of the battery 3 is about 5 to 10 times higher, in comparison with a case in which when the resistor 30 is formed of Cu—Ni or Ni—Cr. Therefore, by forming the resistor 30 from a Cr composite film, the expansion of the battery 3 can be accurately detected.

Additionally, because the sensitivity of the resistance value is high relative to expansion of the battery 3, different operations can be performed in accordance with the degree of expansion of the battery 3. For example, a control such that if it is detected that expansion of the battery 3 is small, a predetermined operation is performed, if it is detected that expansion of the battery 3 is medium, another operation is performed, and if it is detected that expansion of the battery 3 is large, still another operation is performed can be achieved.

Also, if the sensitivity of the resistance value relative to expansion of the battery 3 is high, a signal having a high S/N can be obtained. Therefore, even if the number of averaging times in the A/D conversion circuit of the analog front end section 7 is reduced, the signal can be detected accurately. By reducing the number of averaging times in the A/D conversion circuit, the time required for single A/D conversion can be reduced.

If the resistor 30 is formed of a Cr composite film, the size of the strain gauge 6 can be reduced, so that the resistor 30 can also be used for the small battery pack 1. Additionally, the size of the strain gauge 6 can be reduced, so that the degree of freedom in selecting a location to be disposed can be improved.

Second Embodiment

In a second embodiment, an example in which multiple strain gauges are mounted to a battery pack will be described. In the second embodiment, descriptions of components that are substantially the same as the corresponding components of the embodiment previously described may be omitted.

Figure 6:
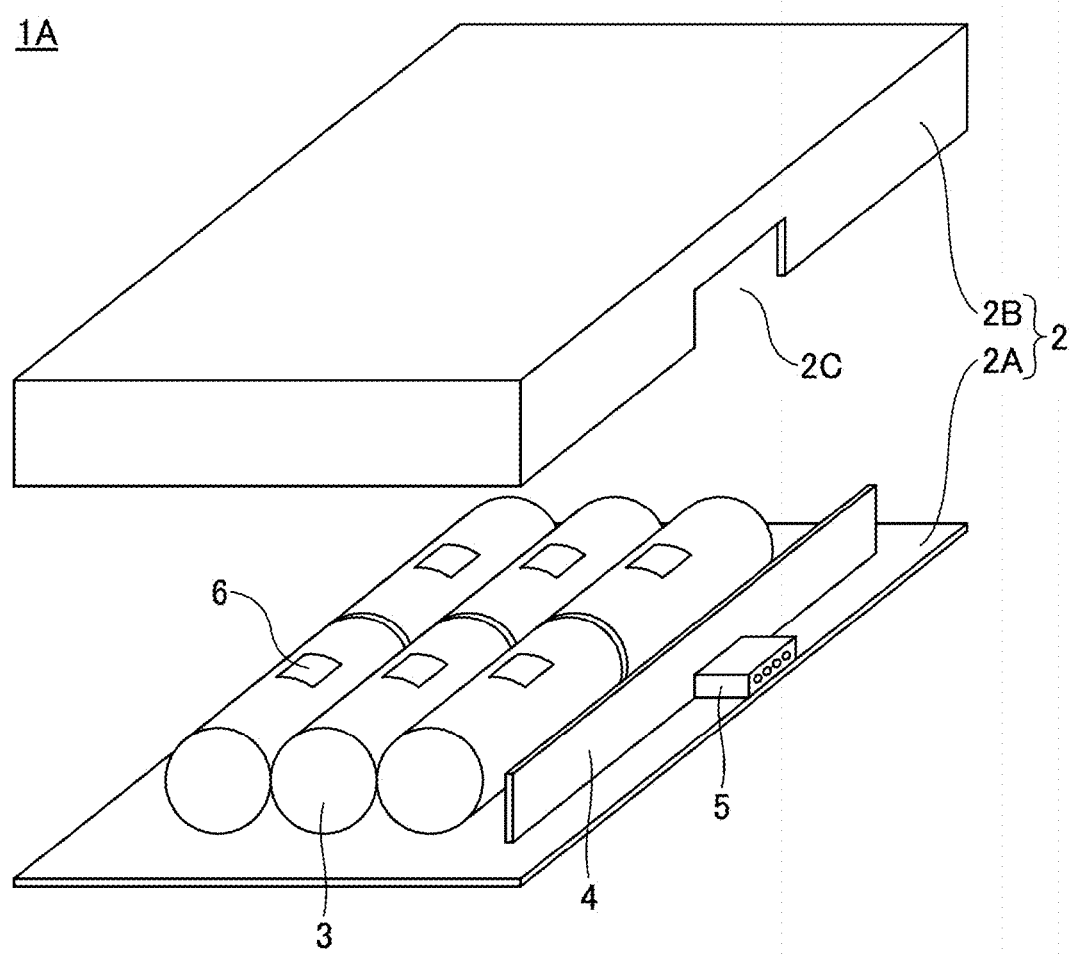
FIG. 6 is an exploded perspective view (part 1) illustrating an example of a battery pack according to a second embodiment.

FIG. 6 is an exploded perspective view (part 1) illustrating a battery pack according to the second embodiment. With reference to FIG. 6, a battery pack 1A differs from the battery pack 1 (see FIG. 1) in that the battery pack 1A includes multiple strain gauges 6.

In the battery pack 1A, the strain gauge 6 is assigned to each battery 3. For example, as illustrated in FIG. 6, single strain gauge 6 can be attached to a surface of each battery 3. However, multiple strain gauges 6 may be attached to each battery 3. The strain gauges 6 may be applied to the inner surface of the upper member 2B, or embedded in the lower member 2A or the upper member 2B so that the strain gauges 6 are respectively provided at positions corresponding to the batteries 3.

Figure 7:
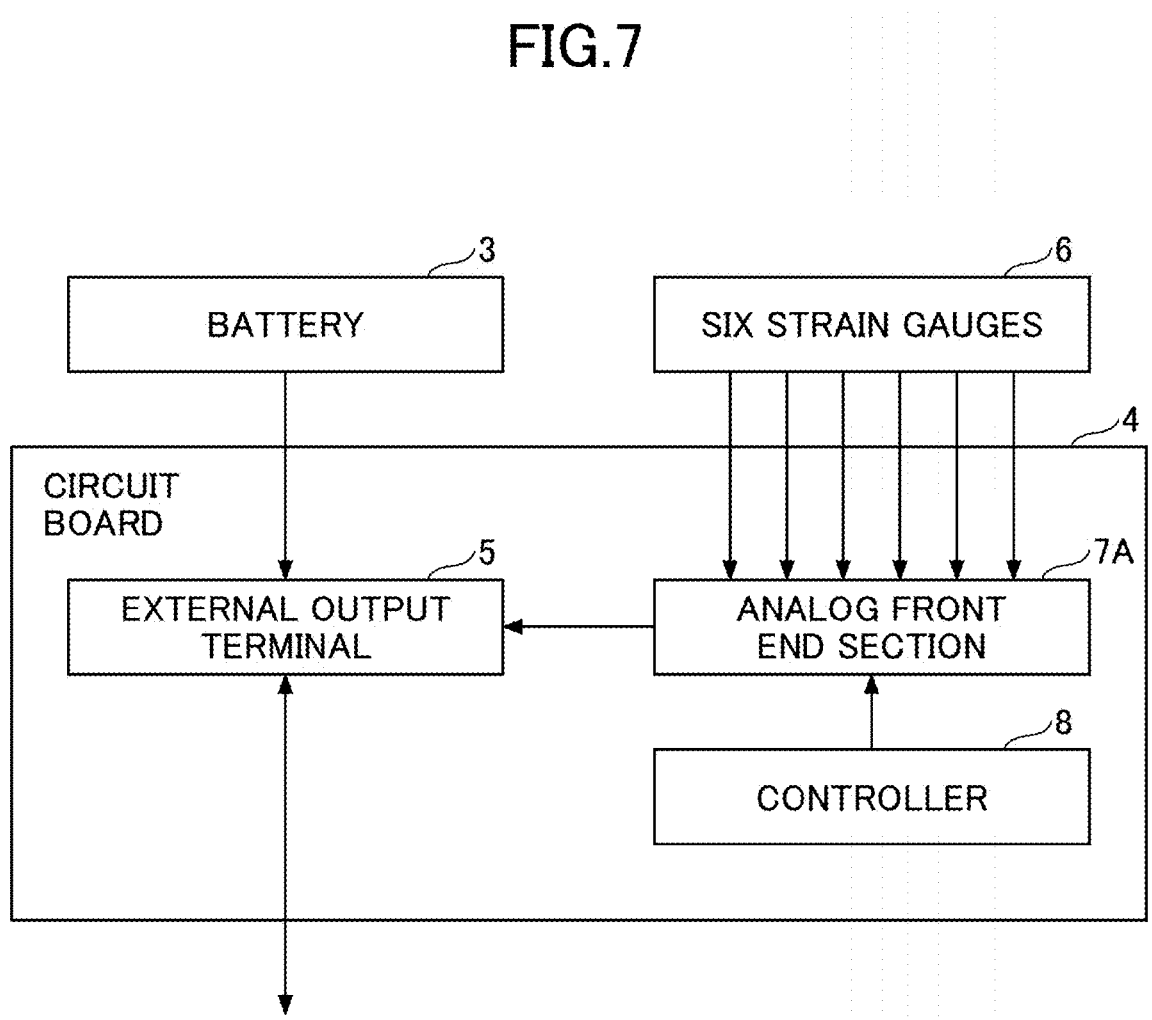
FIG. 7 is a block diagram for describing a circuit board mounted to the battery pack according to the second embodiment.

FIG. 7 is a block diagram for describing a circuit board mounted to the battery pack according to the second embodiment. With reference to FIG. 7, each strain gauge 6 is connected to an analog front end section 7A implemented in a circuit board 4, and an output of the analog front end section 7A is connected to the external output terminal 5. Therefore, information detected by each strain gauge (i.e., information indicating the degree of expansion of each battery 3) can be output from the external output terminal 5.

The analog front end section 7A differs from the analog front end section 7 in that, for example, an input signal selection switch is added. The pair of terminal sections 41 of each strain gauge 6 is connected to the input signal selection switch of the analog front end section 7A, and the input signal selection switch selects a pair of terminal sections 41 of any given one of the strain gauges 6. The pair of terminal sections 41 selected by the input signal selection switch is connected to a bridge circuit.

That is, one side of the bridge circuit is formed of the resistor 30 between the pair of terminal sections 41 selected by the input signal selection switch, and the other three sides are formed of fixed resistances. Therefore, as the output of the bridge circuit, a voltage (i.e., an analog signal) corresponding to a resistance value of the resistor 30 between the pair of terminal sections 41 selected by the input signal selection switch can be obtained.

The voltage output from the bridge circuit is amplified by an amplifier, then is converted into a digital signal by the A/D conversion circuit, and can be output from the external output terminal 5. If a temperature compensation circuit is included, a temperature compensated digital signal can be output from the external output terminal 5.

The analog front end section 7A is connected to a controller 8, and the input signal selection switch of the analog front end section 7A can be controlled by the controller 8. A command of the controller 8 switches the input signal selection switch of the analog front end section 7A at high speed, so that a digital signal corresponding to the resistance value of the resistor 30 between the pair of terminal sections 41 of each of the strain gauges 6 can be output from the external output terminal 5 in a significantly short period of time.

The controller 8 may be configured to include, for example, a central processing unit (CPU), a read only memory (ROM), a random access memory (RAM), a main memory, and the like. In this case, various functions of the controller 8 can be achieved by a program recorded in the ROM or the like being read to the main memory and being executed by the CPU. However, a part or an entire of the controller 8 may be implemented only by hardware. Further, the controller 8 may be physically configured by multiple devices or the like.

The function of shutting off the current interrupt switch and stopping the operation of the battery pack, which is exemplified in the first embodiment, may be incorporated into the controller 8.

As described, in the battery pack 1A, by assigning the strain gauge 6 to each of the batteries 3, the degree of expansion of each of the batteries 3 can be individually detected as a change in a resistance value of the resistor 30. That is, expansion of the battery can be detected more precisely.

Figure 8:
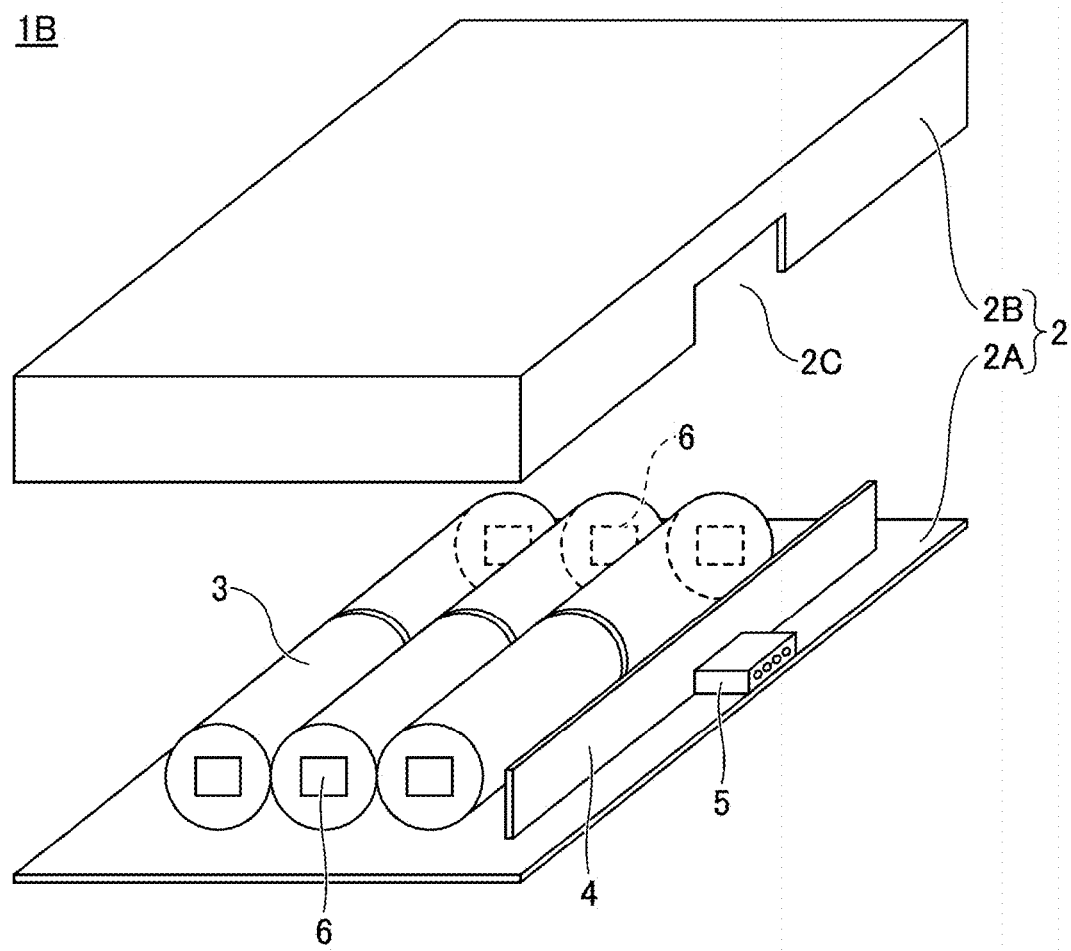
FIG. 8 is an exploded perspective view (part 2) illustrating the example of the battery pack according to the second embodiment.

Here, as in the battery pack 1B illustrated in FIG. 8, the single strain gauge 6 may be attached to one end portion of each of the batteries 3. In FIG. 8, without occupying a limited inner space of the battery pack 1B, detection with space savings using a small portion of the battery 3 can be achieved, and thus the size and weight of the battery pack 1B can be reduced.

As described above, if the resistor 30 is formed of a Cr composite film, the sensitivity of the resistance value relative to expansion of the battery (i.e., the change amount of the resistance value of the resistor 30 relative to the expansion amount of the same battery 3) is significantly improved in comparison with a case in which the resistor 30 is formed of Cu—Ni or Ni—Cr. Therefore, if the resistor 30 is formed of a Cr composite film, the size and weight of the battery pack 1B can be further reduced.

Modified Examples of the Second Embodiment

In a modified example of the second embodiment, an example of a sensor that is different in a structure from the second embodiment will be described. Here, in the modified example of the second embodiment, descriptions of components substantially the same as the corresponding components of the embodiment previously described may be omitted.

Figure 9:
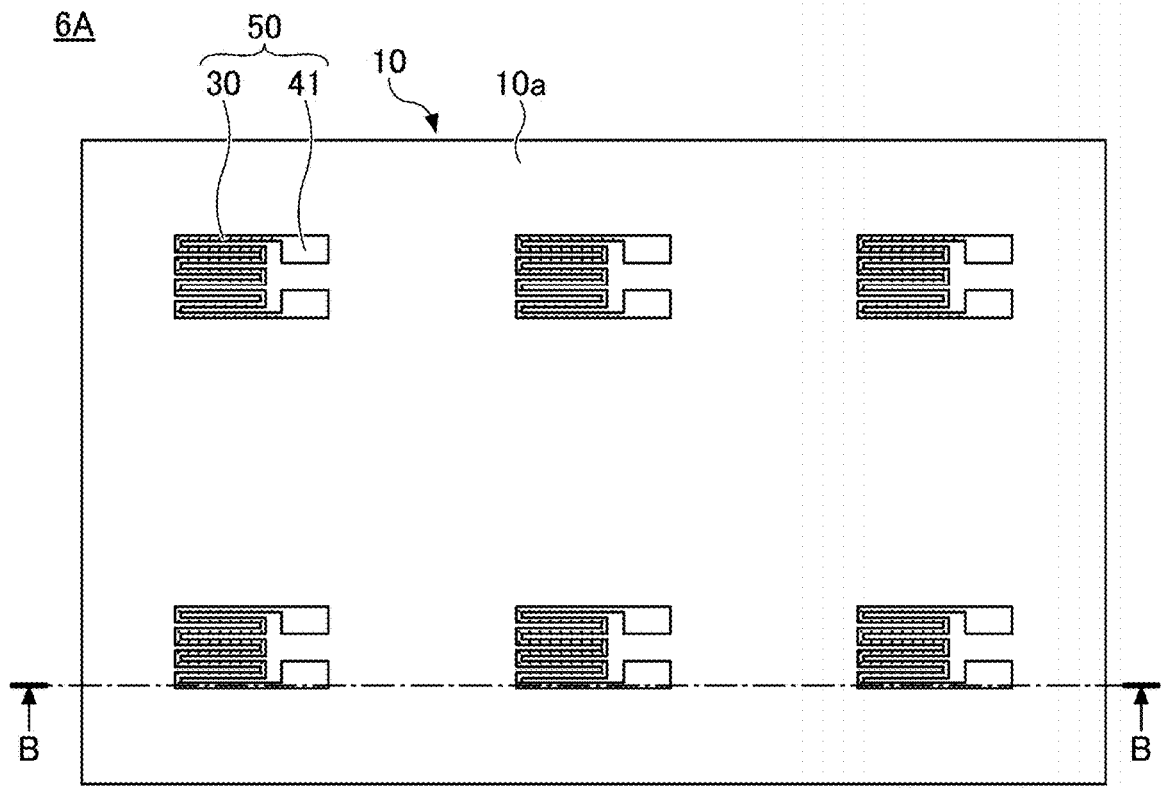
FIG. 9 is a plan view illustrating an example of a sensor mounted to a battery pack according to a modified example of the second embodiment.
Figure 10:
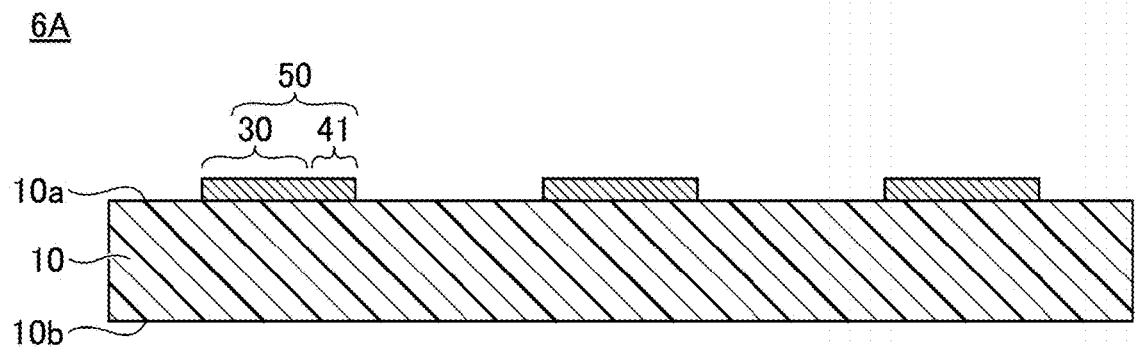
FIG. 10 is a cross-sectional view illustrating the example of the sensor mounted to the battery pack according to the modified example of the second embodiment.

FIG. 9 is a plan view illustrating an example a sensor mounted to a battery pack according to the modified example of the second embodiment. FIG. 10 is a cross-sectional view illustrating the example of the sensor mounted to the battery pack according to the modified example of the second embodiment, and illustrates a cross-section along the line B-B in FIG. 9.

With reference to FIG. 9 and FIG. 10, a sensor 6A is a collection of separate sensors 50 (i.e., strain gauges) assigned to respective batteries 3. Thus, the sensor 6A includes separate sensors 50 for the number of the batteries 3. However, the sensor 6A may include separate sensors 50 for more than the number of the batteries 3, and multiple separate sensors 50 may be assigned to each of the batteries 3.

The separate sensor 50 includes a substrate 10 common in the separate sensors 50 and a resistor 30 and terminal sections 41 provided for each of the separate sensors 50. Each of the separate sensors 50 is arrayed on one side of the same substrate 10.

On the upper surface 10a of the substrate 10, the cover layer 60 described in the first embodiment may be provided so as to cover the resistor 30 of each of the separate sensors 50 and expose the terminal sections 41. Providing the cover layer 60 prevents mechanical damage or the like from occurring in the resistor 30 of each of the separate sensors 50. Providing the cover layer 60 can also protect the resistor 30 of each of the separate sensors 50 from moisture or the like. The cover layer 60 may be provided to cover an entire portion except the terminal sections 41.

The sensor 6A may be attached to the surface of the batteries 3 arranged vertically and horizontally, or may be attached to the inner surface of the upper member 2B, or embedded in lower member 2A or the upper member 2B, for example, so that the separate sensors 50 are disposed at respective positions corresponding to the batteries 3.

As described, instead of a form in which multiple separate strain gauges 6 are used, the sensor 6A in which multiple separate sensors 50 corresponding to the strain gauges 6 are arrayed may be used.

Third Embodiment

In a third embodiment, an example of a sensor that is structurally different from the first and second embodiments will be described. In the third embodiment, descriptions of components substantially the same as the corresponding components of the embodiment previously described may be omitted.

Figure 11:
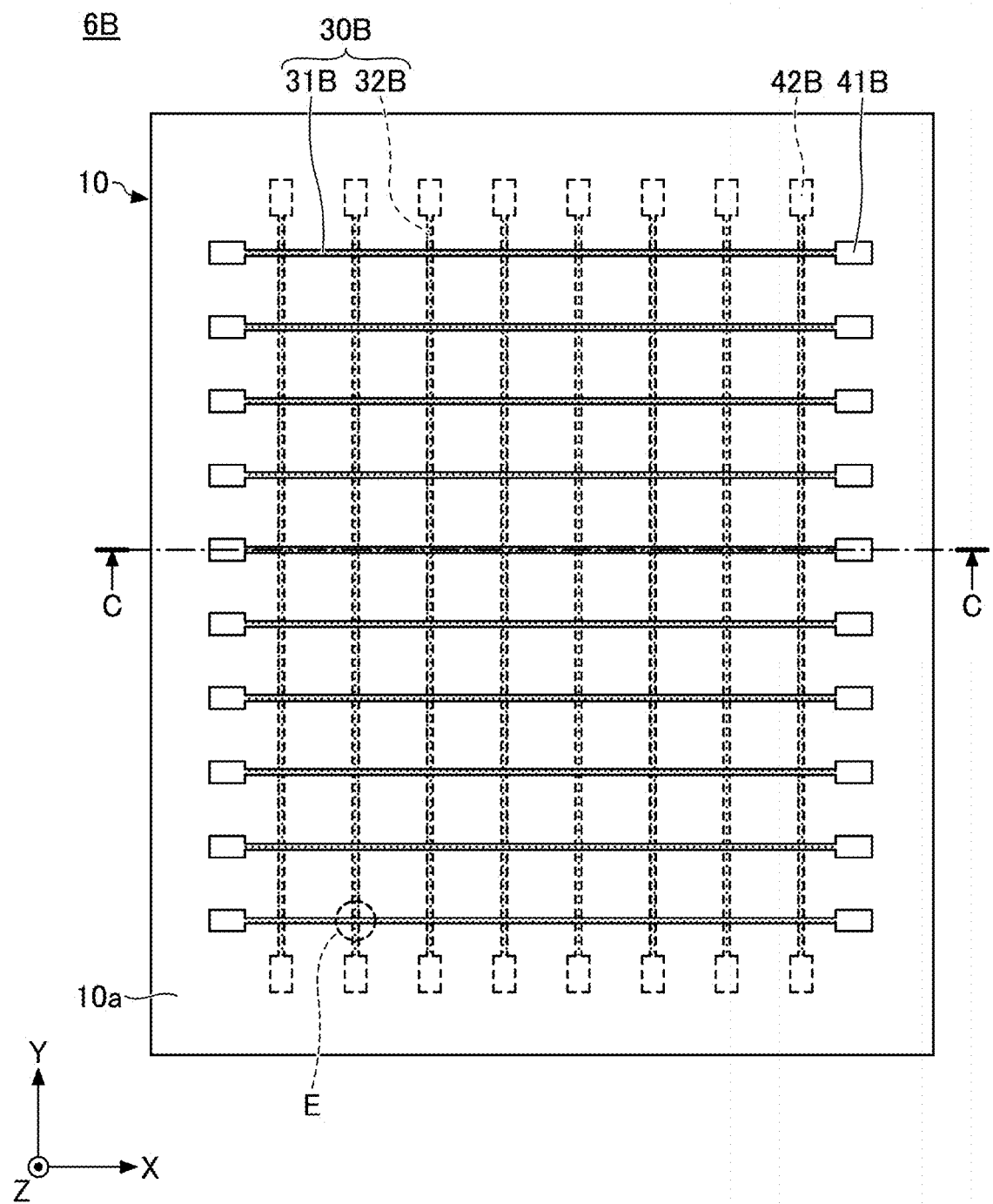
FIG. 11 is a plan view illustrating an example of a sensor mounted to a battery pack according to a third embodiment.
Figure 12:
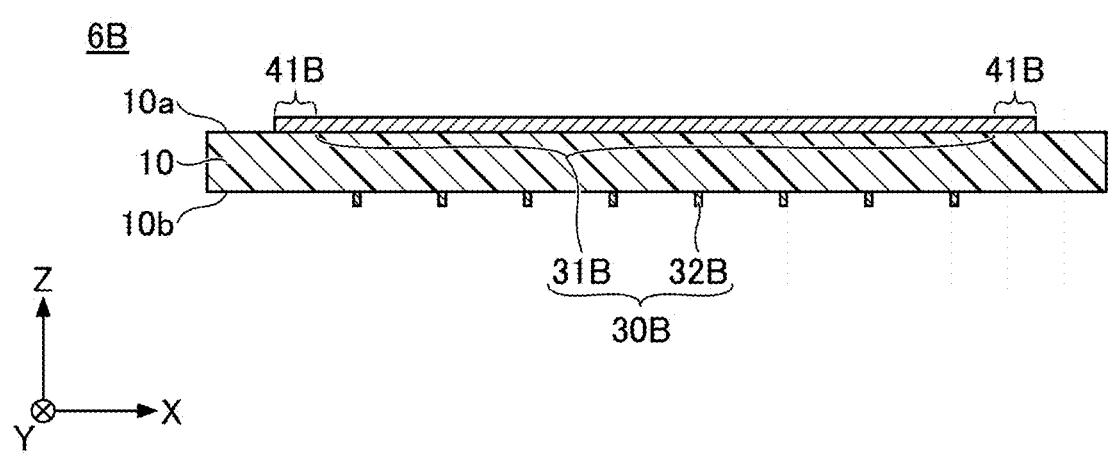
FIG. 12 is a cross-sectional view illustrating the example of the sensor mounted to the battery pack according to the third embodiment.

FIG. 11 is a plan view illustrating an example of a sensor mounted to a battery pack according to the third embodiment. FIG. 12 is a cross-sectional view illustrating the example of the sensor mounted to the battery pack according to the third embodiment, and illustrates a cross-section along the C-C line of FIG. 11.

With reference to FIG. 11 and FIG. 12, a sensor 6B includes resistors 30B and terminal sections 41B and 42B.

The resistors 30B include multiple resistive portions 31B and 32B laminated through the substrate 10. That is, the resistor 30B is a generic term for resistive portions 31B and 32B and if there is no need to specifically distinguish the resistive portions 31B and 32B, the resistive portion 31B or 32B is referred to as the resistor 30B. For the purpose of convenience, in FIG. 11, the resistive portions 31B and 32B are illustrated in a dotted pattern.

The multiple resistive portions 31B are thin films arranged side by side on the upper surface 10a of the substrate 10 in the Y direction at predetermined intervals with the longitudinal direction directed to the X direction. The multiple resistive portions 32B are thin films arranged side by side on the lower surface 10b of the substrate 10 in the X direction at predetermined intervals with the longitudinal direction directed to the Y direction. However, it is not necessary that the multiple resistive portions 31B and the multiple resistive portions 32B are orthogonal to each other in plan view, as long as the multiple resistive portions 31B and the multiple resistive portions 32B intersect with each other.

The width of the resistor 30B is not particularly limited and may be appropriately selected depending on a purpose, but may be, for example, about 0.1 μm to 1000 μm (1 mm). The pitch of the resistors 30B provided adjacent to each other is not particularly limited and may be selected as appropriate depending on a purpose, but may be, for example, about 1 mm to 100 mm. In FIG. 11 and FIG. 12, ten resistive portions 31B and eight resistive portions 32B are illustrated, but the number of the resistive portions 31B and 32B may be appropriately changed as necessary. The material, thickness, manufacturing method, and the like of the resistor 30B may be substantially the same as that of the resistor 30.

The terminal section 41B extends from each end portion of each of the resistive portions 31B on the upper surface 10a of the substrate 10 and is formed in a substantially rectangular shape wider than the resistive portion 31B in plan view. The terminal sections 41B are a pair of electrodes for outputting a change in a resistance value of the resistive portion 31B caused by expansion of the battery 3 to the outside. For example, a flexible substrate for external connection, a lead wire, or the like is bonded to the terminal sections 41B. The upper surface of the terminal section 41B may be coated with a metal having better solderability than the terminal section 41B. For the purpose of convenience, the resistive portion 31B and the terminal section 41B are referenced by different reference signs, but both may be integrally formed of the same material in the same process.

The terminal section 42B extends from each end portion of each of the resistive portions 32B on the lower surface 10b of the substrate 10 and is formed in a substantially rectangular shape wider than the resistive portion 32B in plan view. The terminal sections 42B are a pair of electrodes for outputting a change in a resistance value of the resistive portion 32B caused by expansion of the battery 3 to the outside. For example, a flexible substrate for external connection, a lead wire, or the like is bonded to the terminal sections 42B. The upper surface of terminal section 42B may be coated with a metal having better solderability than the terminal section 42B. For the purpose of convenience, the resistive portion 32B and the terminal section 42B are referenced by different reference signs, but, the resistive portion 32B and the terminal section 42B may be integrally formed of the same material in the same process.

A through-hole passing through the substrate 10 may be provided, and the terminal sections 41B and 42B may be concentrated on the upper surface 10a or the lower surface 10b of the substrate 10.

To cover the resistive portion 31B and expose the terminal section 41B, the cover layer 60 described in the first embodiment may be provided on the upper surface 10a of the substrate 10. Additionally, to cover the resistive portion 32B and expose the terminal section 42B, the cover layer 60 described in the first embodiment may be provided on the lower surface 10b of the substrate 10. Providing the cover layer 60 prevents mechanical damage or the like from occurring on the resistive portions 31B and 32B, In addition, providing the cover layer 60 can protect the resistive portions 31B and 32B from moisture or the like. The cover layer 60 may be provided to cover the entire portion except the terminal sections 41B and 42B.

All the terminal sections 41B and 42B of the sensor 6B are coupled, for example, to the input signal selection switch of the analog front end section 7A illustrated in FIG. 7 and operate in a manner similar to the second embodiment. That is, by a command of the controller 8, the input signal selection switch of the analog front end section 7A is switched at high speed, so that digital signals corresponding to the resistance values of all the terminal sections 41B and 42B of the sensor 6B can be output from the external output terminal 5 in a significantly short time.

The digital signal output from the external output terminal 5 includes information indicating a position where the battery 3 expands as well as information indicating the degree of expansion of the battery 3. Therefore, the device or the like connected to the external output terminal 5, for example, can detect that a portion E illustrated in FIG. 11 expands when a resistance value of the resistive portion 31B located at the lowest portion of FIG. 11 and a resistance value of the resistive portion 32B located at a second position from the left change.

Further, the device or the like connected to the external output terminal 5 can detect the degree of expansion at the portion E illustrated in FIG. 11 based on the magnitude of the change in the resistance value of the resistive portion 31B located at the lowest portion and the magnitude of the change in the resistance value of the resistive portion 32B located at the second position from the left.

Further, the device or the like connected to the external output terminal 5 can detect that the battery 3 has expanded at multiple positions when resistance values of multiple resistive portions 31B or resistance values of multiple resistive portions 32B change.

Here, if the degree of expansion of the battery 3 is small, there is a case in which only a resistive portion closer to the battery 3 among the resistive portions 31B and the resistive portions 32B is pressed, and a resistive portion farther from the battery 3 is not pressed. In this case, only a resistance value between the pair of electrodes of the resistive portion closer to the battery 3 continuously changes in accordance with expansion of the battery 3. Also in this case, the device or the like connected to the external output terminal 5 can detect the degree of expansion of the battery 3 based on the magnitude of the change in the resistance value of the resistive portion closer to the battery 3.

That is, when the resistive portion 31B and/or the resistive portion 32B are pressed due to expansion of the battery 3, a resistance value between the pair of electrodes of the pressed resistive portion (i.e., the resistive portion 31B and/or the resistive portion 32B) continuously changes in accordance with the magnitude of the pressing pressure. The device or the like connected to the external output terminal 5 can detect the magnitude of the pressing pressure (i.e., the expansion of the battery 3) based on the magnitude of the change in the resistance value of the pressed resistive portion regardless of whether either the resistive portion 31B or the resistive portion 32B is pressed or both are pressed.

The sensor 6B may be attached to the surface of the batteries 3 that are vertically and horizontally arranged, may be attached to the inner surface of the upper member 2B, or embedded in the lower member 2A or the upper member 2B, for example.

As described, in the third embodiment, the sensor 6B that includes the resistors 30B including multiple resistive portions 31B arranged side by side with the longitudinal direction directed to a first direction and multiple resistive portions 32B arranged side by side with the longitudinal direction directed to a second direction intersecting the first direction is used.

Thereby, three-dimensional information including a position where the battery 3 expands and the degree of expansion can be accurately obtained. That is, because information of stress applied on an entire of the battery pack is obtained, and a portion where the stress is concentrated can be grasped in detail, the expansion of the battery 3 can be accurately detected. Similarly with the first embodiment, it is particularly preferable that the resistive portions 31B and 32B are formed of a Cr composite film.

Modified Example of the Third Embodiment

In a modified example of the third embodiment, an example in which a resistor of a sensor is formed in a zigzag pattern will be described. Here, in the modified example of the third embodiment, the description of a component substantially the same as the component of the embodiment previously described may be omitted.

Figure 13:
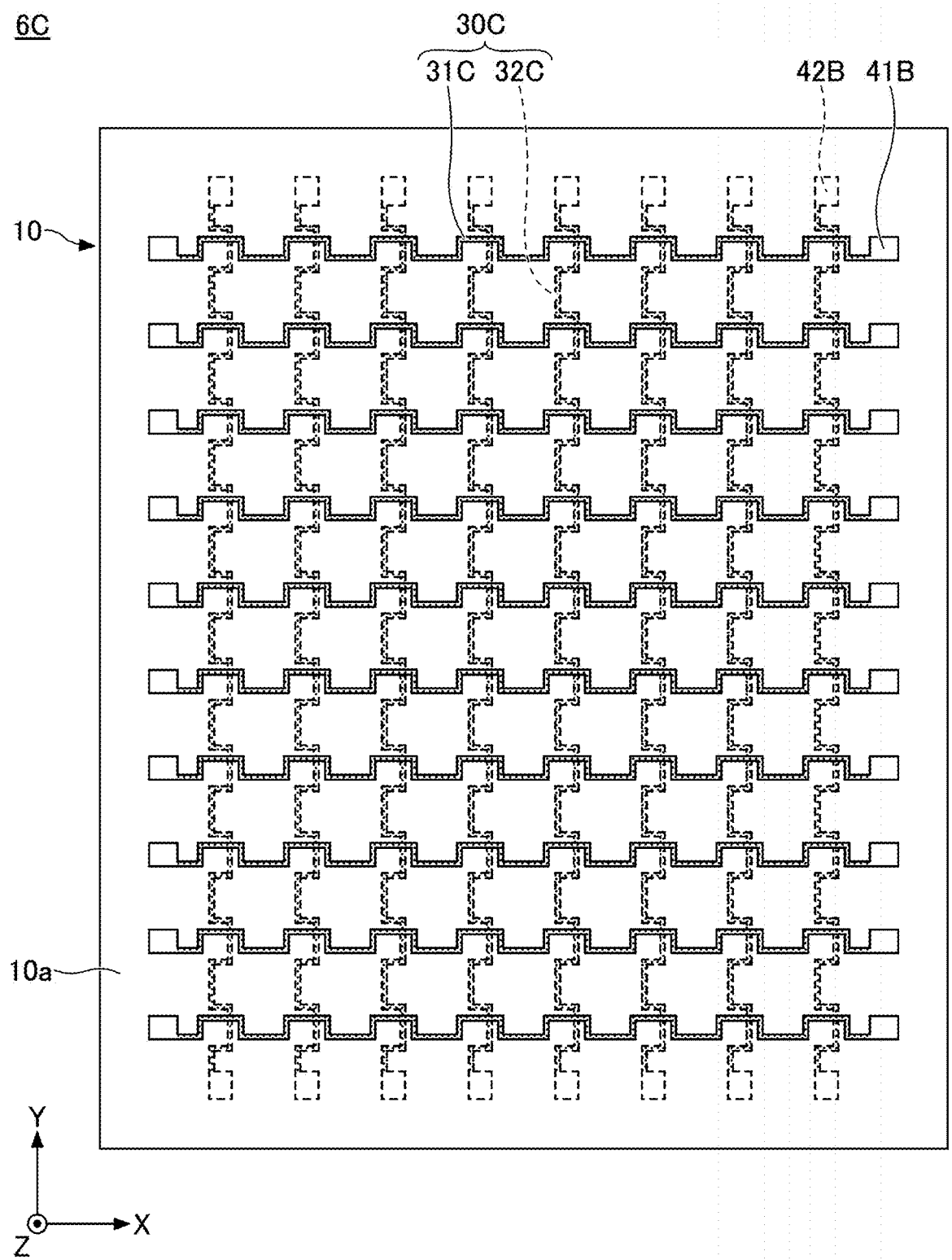
FIG. 13 is a plan view illustrating an example of a sensor mounted to a battery pack according to a modified example of the third embodiment.

FIG. 13 is a plan view illustrating an example of a sensor mounted to a battery pack according to the modified example of the third embodiment, and illustrates a plane corresponding to FIG. 11. With reference to FIG. 13, a sensor 6C differs from the sensor 6B (see FIG. 11 and FIG. 12) in that the resistors 30B are replaced by resistors 30C.

The resistors 30C include resistive portions 31C and 32C. The resistive portion 31C is formed in a zigzag pattern and formed between the pair of terminal sections 41B. The resistive portion 32C is formed in a zigzag pattern and formed between the pair of terminal sections 42B. The material, thickness, manufacturing method, and the like of the resistor 30C can be the same as that of the resistor 30.

As described, the resistive portions 31C and 32C are formed in a zig-zag pattern, so that a resistance value between the pair of terminal sections 41B and a resistance value between the pair of terminal sections 42B can increase in comparison with a case where the resistive portions 31C and 32C are formed in a linear pattern. As a result, the change amount of the resistance value between the pair of terminal sections 41B and the change amount of the resistance value between the pair of terminal sections 42B, caused when the battery 3 expands to press the resistive portions 31C and 32C, increases, so that the three-dimensional information including the position where the battery 3 expands and the degree of expansion can be obtained more accurately.

Additionally, because the resistance value between the pair of terminal sections 41B and the resistance value between the pair of terminal sections 42B can increase, the power consumption of the sensor 60 can be reduced.

Fourth Embodiment

In a fourth embodiment, an example of a sensor that differs in a structure from the sensors of the first to third embodiments will be described. In the fourth embodiment, the description of a component the same as the component of the embodiment previously described may be omitted.

Figure 14:
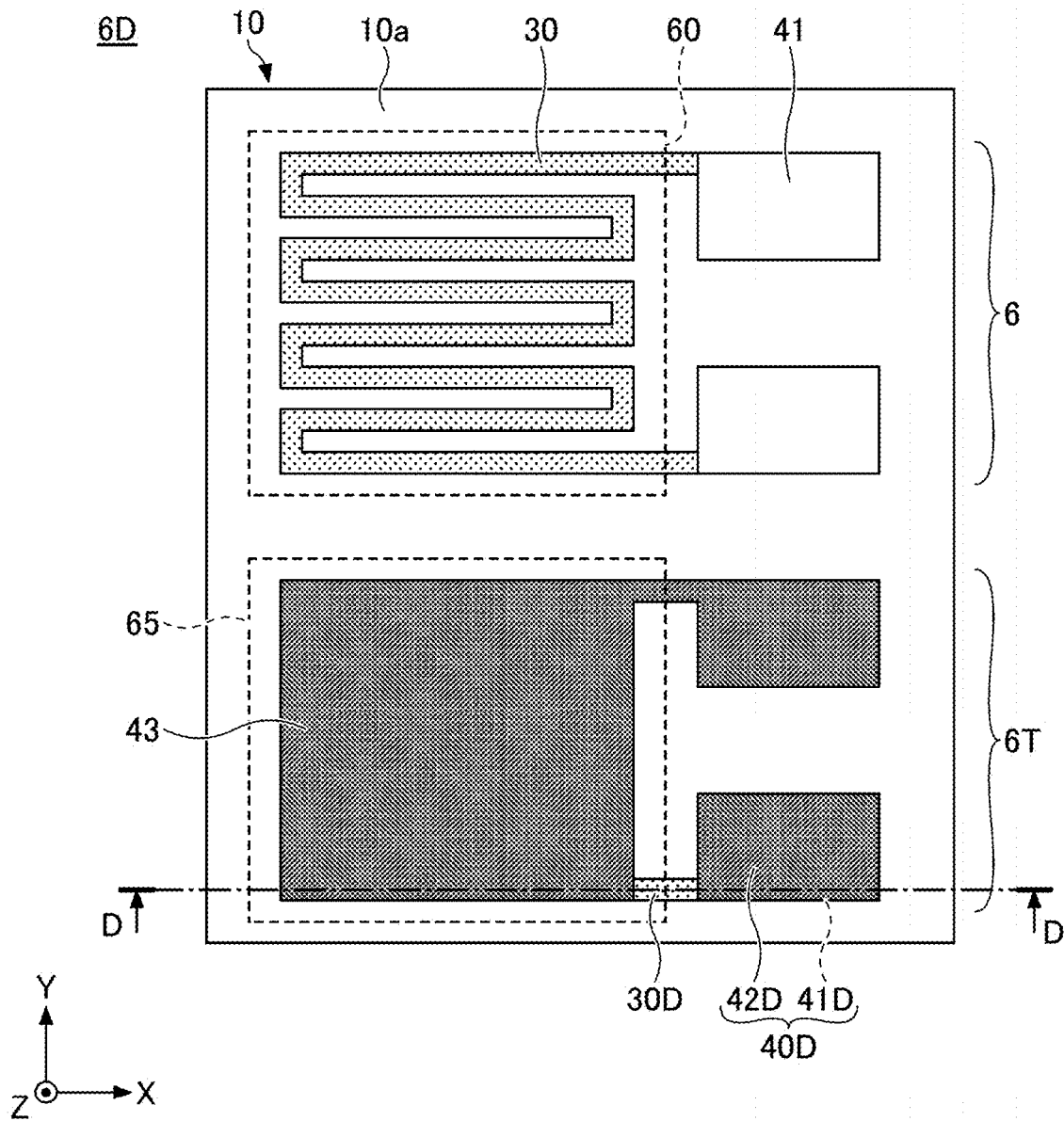
FIG. 14 is a plan view illustrating an example of a sensor mounted to a battery pack according to a fourth embodiment.
Figure 15:
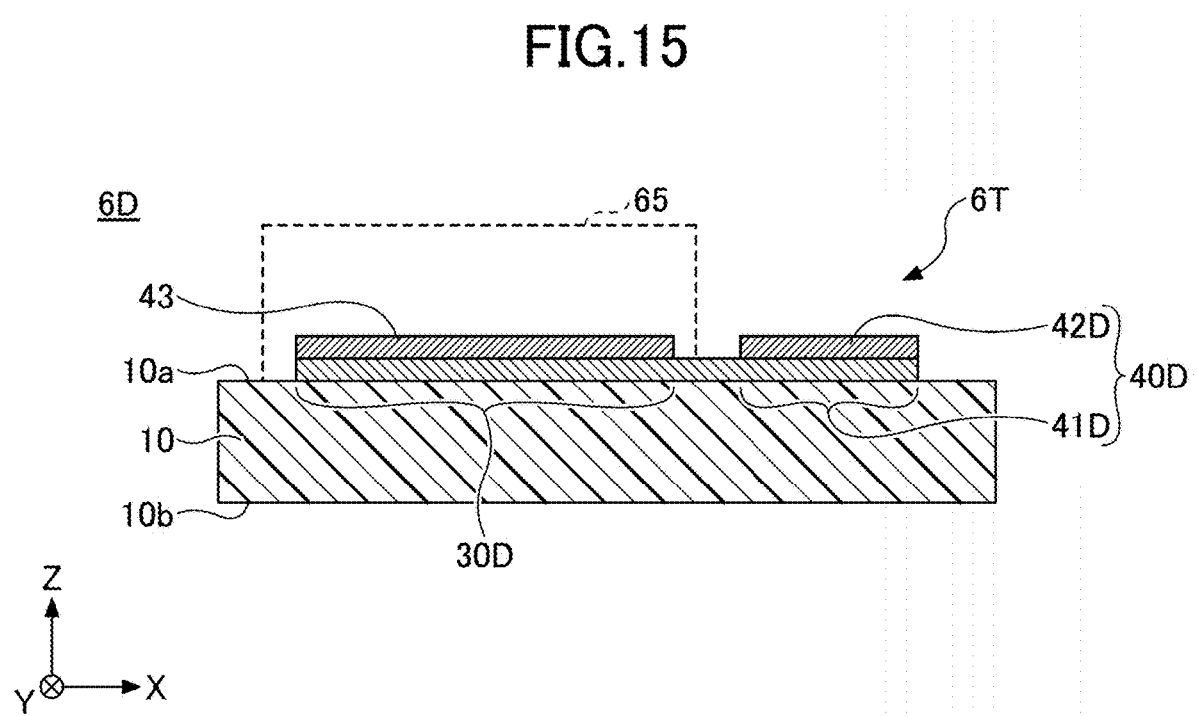
FIG. 15 is a cross-sectional view illustrating the example of the sensor mounted to the battery pack according to the fourth embodiment.

FIG. 14 is a plan view illustrating an example of a sensor mounted to a battery pack according to the fourth embodiment. FIG. 15 is a cross-sectional view illustrating the example of the sensor mounted to the battery pack according to the fourth embodiment, and illustrates a cross-section along the D-D line of FIG. 14.

With reference to FIG. 14 and FIG. 15, a sensor 6C includes a strain gauge 6 and a temperature detecting unit 6T being a temperature sensor that are formed on the substrate 10. The strain gauge 6 and the temperature detecting unit 6T are arranged independently of each other and are not electrically coupled.

Here, in FIG. 14 and FIG. 15, the strain gauge 6 and the temperature detecting unit 6T are disposed from the upper side of the paper, but the disposition is not limited to this. The strain gauge 6 and the temperature detecting unit 6T can be disposed as desired.

The temperature detecting unit 6T includes a metal layer 30D, a metal layer 43, and an electrode 40D that are formed on the substrate 10.

The metal layer 30D is a thin film formed solid on the substrate 10. The metal layer 30D may be directly formed on the upper surface 10a of the substrate 10 or may be formed through another layer on the upper surface 10a of the substrate 10. The material and thickness of the metal layer 30D may, for example, be substantially the same as the material and thickness of the resistor 30.

The metal layer 43 is a solid thin film laminated on the metal layer 30D. The material of the metal layer 43 is not particularly limited as long as the material is different from the material of the metal layer 30D, and can be appropriately selected depending on a purpose. Examples of the material of the metal layer 43 include Cu, Ni, Al, Ag, Au, Pt, or an alloy of any of these metals, a compound of any of these metals, or a laminated film in which the alloy of any of these metals and the compound of any of these metals are laminated as appropriate. The thickness of the metal layer 43 is not particularly limited and may be selected as desired depending on a purpose, but may be, for example, about 0.01 μm to 30 μm.

Because the metal layer 30D is formed of a material different from the material of the metal layer 43, the metal layer 30D and the metal layer 43 can function as a thermocouple. By forming the metal layers 30D and 43 as a solid thin film, the effect of strain can be reduced and the temperature can be accurately detected.

The electrode 40D may be formed in a laminated structure in which a metal layer 42D is laminated on a terminal section 41D. The terminal section 41D extends from each end portion of the metal layer 30D and is formed a substantially rectangular shape in plan view. One metal layer 42D extends from one end portion of the metal layer 43 and is formed in a substantially rectangular shape on one terminal section 41D in plan view. The other metal layer 42D is formed in a substantially rectangular shape on the other terminal section 41D, but is not electrically coupled to the metal layer 43.

The electrodes 40D are a pair of electrodes for outputting the potential difference (i.e., thermoelectric force) that occurs between the metal layer 30D and the metal layer 43 in response to a change in the ambient temperature of the strain gauge 6. For example, a lead wire for external connection is bonded to the electrode 40D.

To cover the metal layers 30D and 43 and expose the electrodes 40D, a moisture-proof layer 65 may be provided on the upper surface 10a of the substrate 10. By providing the moisture-proof layer 65, the influence of moisture on the metal layers 30D and 43 are reduced and the temperature can be accurately detected. The moisture-proof layer 65 may be provided to cover a wide area except the electrodes 40D.

The material of the moisture-proof layer 65 is not particularly limited as long as the material can reduce the influence of moisture on the metal layers 30D and 43, and may be appropriately selected depending on a purpose. Examples of the material include high density polyethylene, polyvinylidene chloride, polytetrafluoroethylene, polypropylene, butyl rubber, and the like. The thickness of the moisture-proof layer 65 is not particularly limited and may be appropriately selected depending on a purpose, but may be, for example, about 2 μm to 30 μm.

For the purpose of convenience, the resistor 30, the terminal section 41, the metal layer 30D, and the terminal section 41D are referenced by different reference signs, but these can be integrally formed of the same material in the same process. For the purpose of convenience, the metal layer 42D and the metal layer 43 are referenced by different reference signs, but these can be integrally formed of the same material in the same process.

For example, in FIG. 1 and FIG. 6, instead of the strain gauge 6, the sensor 6D, in which a temperature detection function is added to the strain gauge 6, may be used.

Thereby, in addition to deformation (expansion and contraction) of the battery 3, temperature information of the battery 3 can be obtained. By outputting the temperature information of the battery 3 from the external output terminal 5 and monitoring the temperature from the outside, thermal runaway of the battery pack 1 or the like can be avoided.

One or more temperature detecting units 6T may be formed on the substrate 10 of the sensor 6A illustrated in FIG. 9 and FIG. 10, the sensor 6B illustrated in FIG. 11 and FIG. 12, and the sensor 6C illustrated in FIG. 13. In this case, the same effect as described above is obtained.

An example in which the strain gauge 6 and the temperature detecting unit 6T are formed on the same substrate 10 has been described. However, the temperature detecting unit 6T may be provided on a substrate other than the substrate on which the strain gauge 6 is provided. Additionally, instead of the temperature detecting unit 6T, a general-purpose temperature sensor (i.e., thermocouple, thermistor, and so on) may be used.

Fifth Embodiment

In a fifth embodiment, an example in which the strain gauge is applied to the outside of the housing of the battery pack will be described. In the fifth embodiment, the description of a component substantially the same as the component of the embodiment previously described may be omitted.

Figure 16:
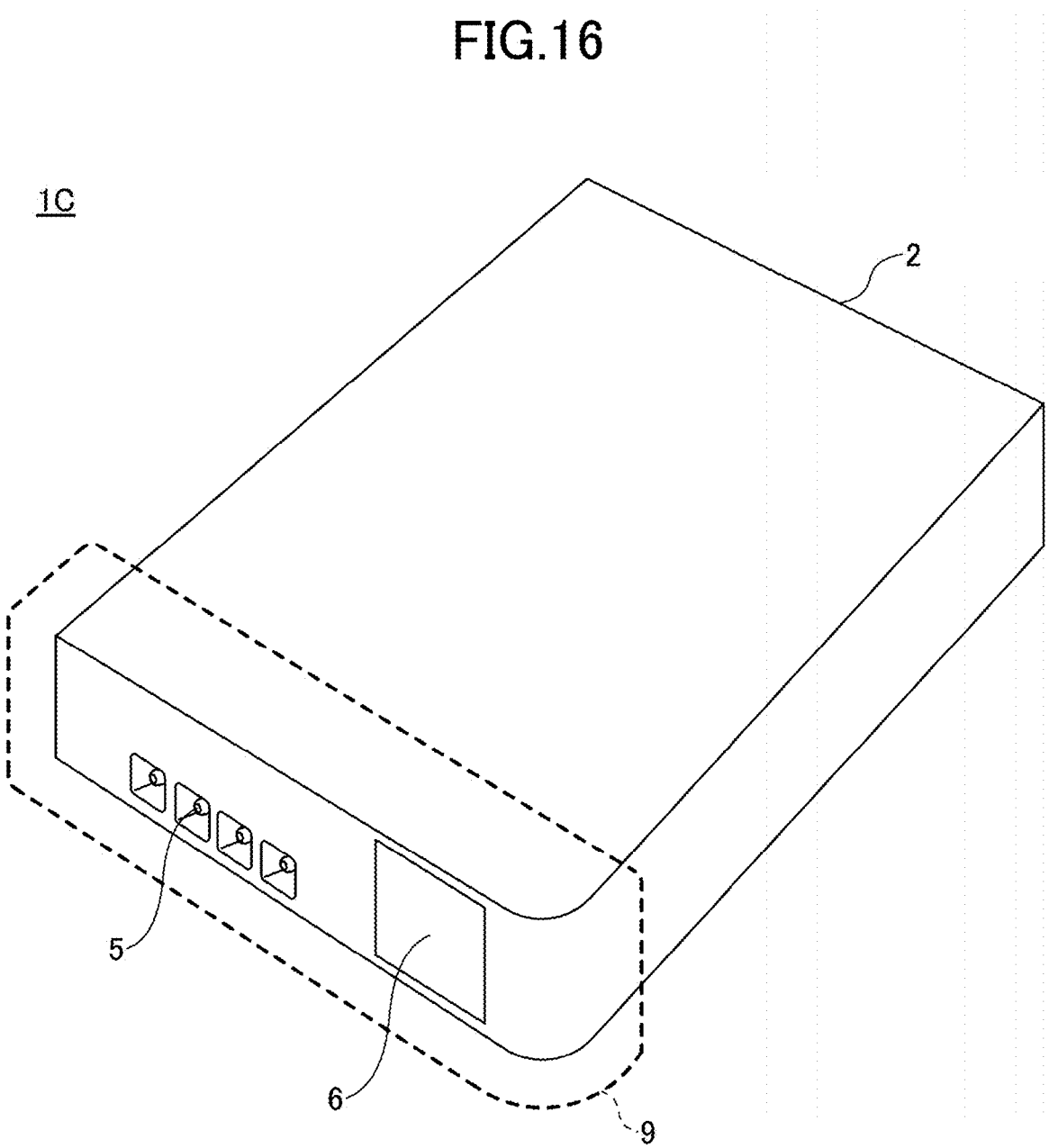
FIG. 16 is a perspective view illustrating an example of a battery pack according to a fifth embodiment.

FIG. 16 is a perspective view illustrating an example of a battery pack according to the fifth embodiment. With reference to FIG. 16, a battery pack 10 includes a circuit board 4 on which a CPU or the like is implemented and the housing 2 that accommodates the battery 3 (which is not illustrated), and at an end portion of the housing 2, a sealing portion 9 sealing the external output terminal 5 by using resin, low-temperature glass, or the like is provided.

The sealing portion 9 slightly deforms when the battery 3 expands. Therefore, by attaching the strain gauge 6 to the surface of the sealing portion 9, the expansion of the battery 3 can be detected. As described above, if the resistor 30 is formed of a Cr composite film, the sensitivity of the resistance value relative to expansion of the battery 3 (i.e., the change amount of the resistance value of the resistor 30 relative to expansion amount of the same battery 3) is significantly improved in comparison with a case in which the resistor 30 is formed of Cu—Ni or Ni—Cr. Therefore, by forming the resistor 30 from the Cr composite film, the expansion of the battery 3 can be accurately detected even when the strain gauge 6 is applied to a portion that is less likely to deform, such as the sealing portion 9.

For example, this can be used for objects such as thin objects, objects having limited thickness and size, and framed grip sensors.

Here, instead of the strain gauge 6, the sensor 6A illustrated in FIG. 9 and FIG. 10, the sensor 6B illustrated in FIG. 11 and FIG. 12, the sensor 6C illustrated in FIG. 13, and the sensor 6D illustrated in FIG. 14 may be used. In this case, the same effect described above is obtained.

Sixth Embodiment

In a sixth embodiment, an example in which the strain gauge is sealed will be described. In the sixth embodiment, the description of a component substantially the same as the component of the embodiment previously described may be omitted.

Figure 17:
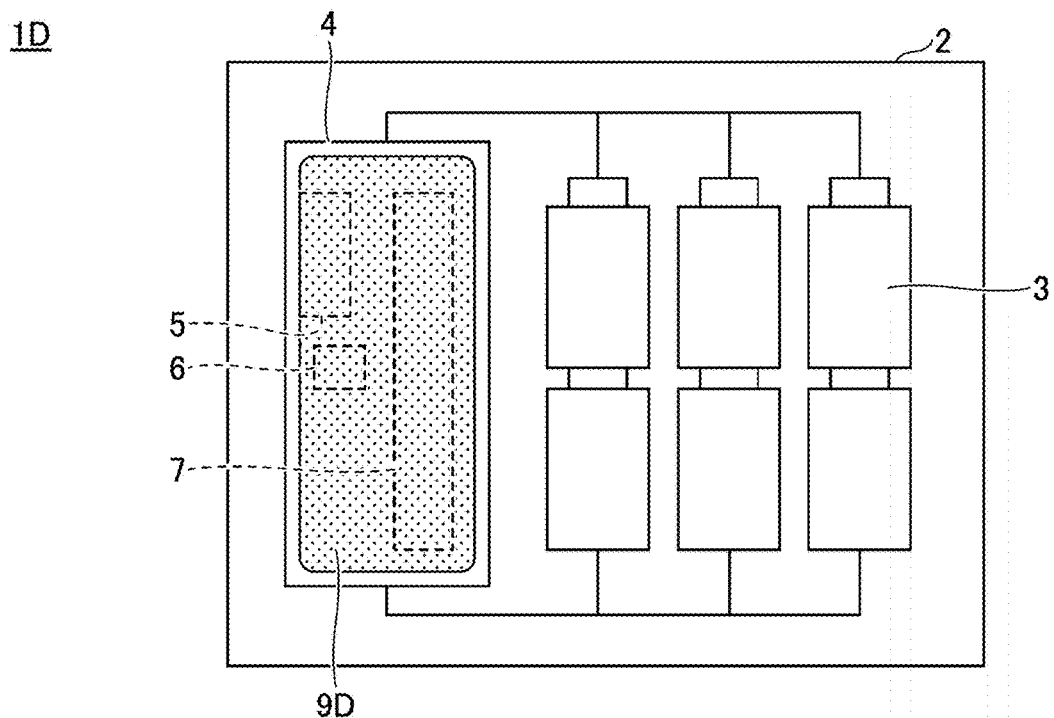
FIG. 17 is a schematic diagram illustrating an example of a battery pack according to a sixth embodiment.
Figure 18:
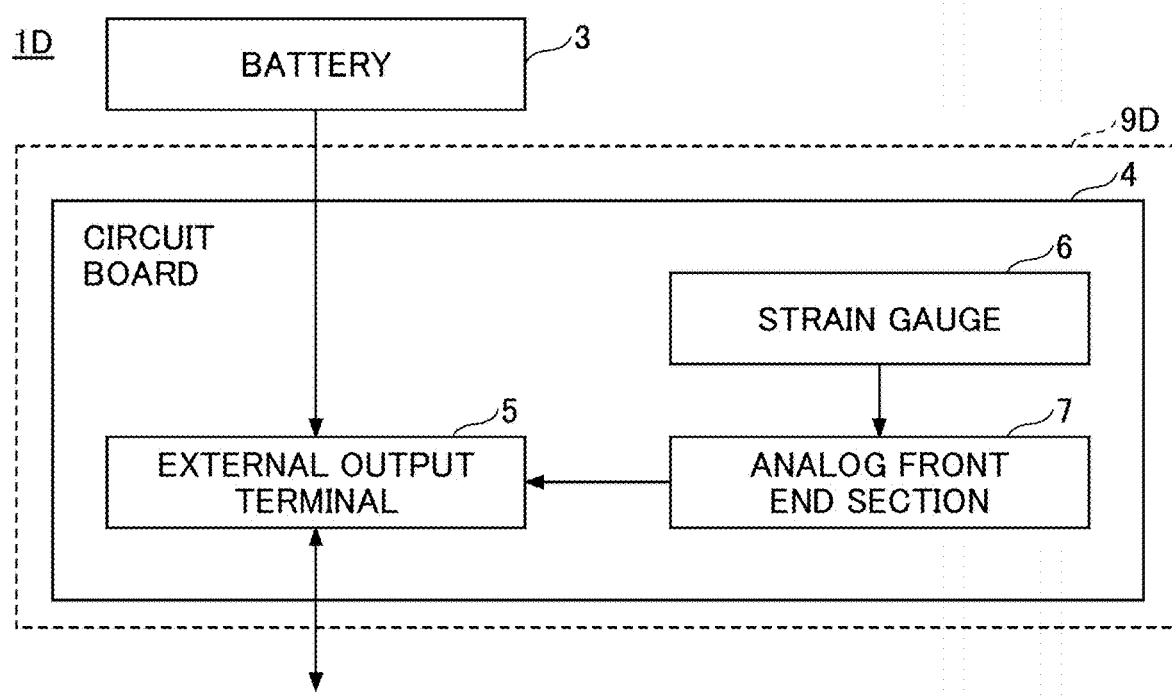
FIG. 18 is a block diagram illustrating the example of the battery pack according to the sixth embodiment.

FIG. 17 is a schematic diagram illustrating an example of a battery pack according to the sixth embodiment. FIG. 18 is a block diagram illustrating an example of the battery pack according to the sixth embodiment.

With reference to FIG. 17 and FIG. 18, similarly with the battery pack 1 and the like, a battery pack 1D includes the housing 2, multiple batteries 3, the circuit board 4, the external output terminal 5, and the strain gauge 6.

In the battery pack 1D, the strain gauge 6 is attached to the circuit board 4 and is hermetically sealed together with the external output terminal 5 and the analog front end section 7 that are implemented on the circuit board 4 by a sealing portion 9D made of resin or low-temperature glass. If a voltage monitoring circuit, a protection circuit, a current detection circuit, and the like of the battery 3 are implemented on the circuit board 4, the circuit board 4 can be hermetically sealed by the sealing portion 9D with including these circuits.

The resistor 30 of the strain gauge 6 is preferably formed of a Cr composite film having better heat resistance. If the resistor 30 of the strain gauge 6 is formed of the Cr composite film, the strain gauge 6 has heat resistance sufficient be sealed by resin or low-temperature glass, and the strain gauge 6 is hermetically sealed by the sealing portion 9D made of resin or low-temperature glass, thereby improving robustness.

Here, instead of the strain gauge 6, the sensor 6A illustrated in FIG. 9 and FIG. 10, the sensor 6B illustrated in FIG. 11 and FIG. 12, the sensor 6C illustrated in FIG. 13, and the sensor 6D illustrated in FIG. 14 may be used. In this case, the same effect described above is obtained.

<Simulation>

By using finite element method analysis software, strain generated in the transverse direction of the battery pack, strain generated in the longitudinal direction, and strain generated in the oblique direction of 45 degrees when the battery expanded were simulated.

Figure 19:
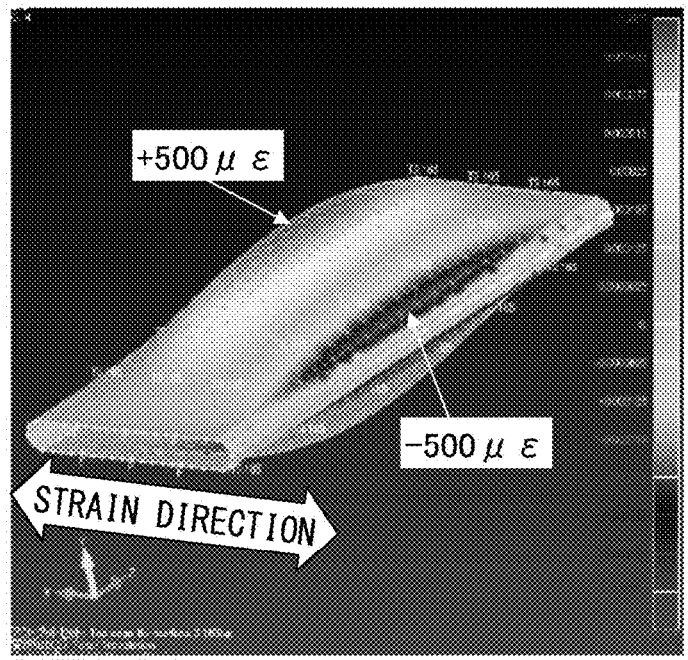
FIG. 19 illustrates a simulation result of a strain occurring in a transverse direction of a battery pack when the battery expands.
Figure 20:
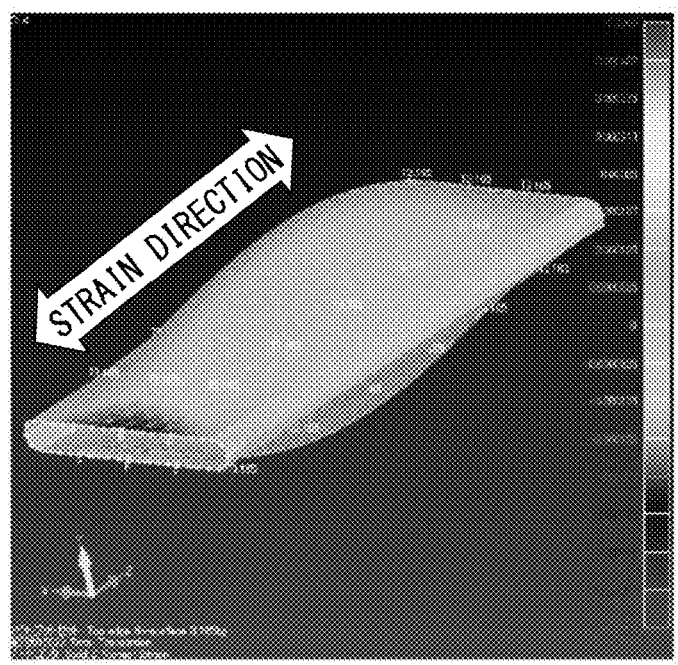
FIG. 20 illustrates a simulation result of a strain occurring in a longitudinal direction of a battery pack when the battery expands.
Figure 21:
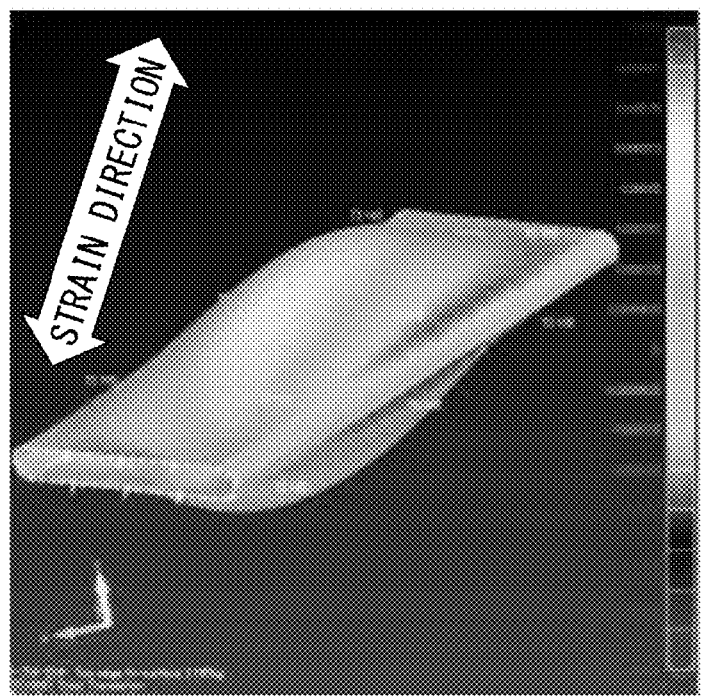
FIG. 21 illustrates a simulation result of a strain occurring in an oblique 45 degrees direction of a battery pack when the battery expands.

The results are illustrated in FIGS. 19, 20 and 21. FIG. 19 illustrates a simulation result of the strain generated in the transverse direction of the battery pack when the battery expands. FIG. 20 is a simulation result of the strain generated in the longitudinal direction of the battery pack when the battery expands. FIG. 21 is a simulation result of the strain generated in the oblique direction of 45 degrees of the battery pack when the battery expands.

As illustrated in FIGS. 19 to 21, in a sheet or box type battery pack, if gas is generated inside the battery disposed within the housing of the battery pack, the battery expands and a central portion of the upper and/or lower surface of the housing of the battery pack rises most. Then, tensile (expansion) strain is generated in the vicinity of the raised portion of the housing.

At the central portion of the upper and/or lower surface of the housing of the battery pack, a tensile strain up to +500µε is generated. Thus, by attaching the strain gauge 6 to the central portion of the upper surface and/or the lower surface of the housing of the battery pack, the abnormality of the battery pack can be detected more reliably and earlier.

In the present specification, the central portion of the upper surface of the housing is defined as an area inside a circle drawn with 10% of the length of the upper surface in the transverse direction as a radius, and with an intersection of a line dividing the area of the upper surface into two in the longitudinal direction and a line dividing the area of the upper surface into two in the transverse direction as a center. The substantially same definition applies to the central portion of the lower surface of the housing.

Attaching the strain gauge to the central portion of the upper surface of the housing of the battery pack is defined as an entirety of the strain gauge being within the above-described circle. The same definition applies to the case where a strain gauge is attached to the central portion of the lower surface of the housing of the battery pack.

At the end portion of the upper and/or lower of the housing of the battery pack, compressive strain up to −500µε is generated. Thus, by attaching the strain gauge 6 to the end portion of the upper surface and/or lower surface of the housing of the battery pack, the abnormality of the battery pack can be detected more reliably and earlier.

In the present specification, the end portion of the upper surface of the housing is defined as an annular region that has a width of 10% of the length of the upper surface in the transverse direction and that extends from an edge being a border between the upper surface and each side surface of the housing toward the upper surface, and an annular region that has a width of 10% of the length of the upper surface in the transverse direction and that extends from the edge being a border between the upper surface and each side surface of the housing toward each side surface. The substantially same definition applies to the end portion of the lower surface of the housing.

Attaching the strain gauge to the end portion of the upper surface of the housing is defined as an entirety of the strain gauge being within at least one of the annular region extending to the upper surface and the annular region extending to each side surface. The same definition applies to the case where the strain gauge is attached to the end portion of the lower surface of the housing of the battery pack.

In FIG. 21, a large compressive strain is generated at the corner portion of the upper surface and/or lower surface of the housing of the battery pack. Thus, by attaching the strain gauge 6 to the corner portion of the upper surface and/or lower surface of the housing of the battery pack, the abnormality of the battery pack can be detected more reliably and earlier. In this case, it is preferable that the strain gauge 6 is attached such that the longitudinal direction of the resistor 30 of the strain gauge 6 is aligned with a strain direction (i.e., the oblique direction of 45 degrees relative to the battery pack).

In the present specification, the corner portion of the upper surface of the housing is defined as an area inside a fan shape drawn with each vertex of the upper surface of the housing as a center and with a length of 10% of the length of the upper surface in the transverse direction as a radius. The same definition applies to the corner portion of the lower surface of the housing.

Attaching the strain gauge to the corner portion of the upper surface of the housing is defined as an entire strain gauge being within at least one of the above-described fan shapes. The same definition applies to the case where the strain gauge is attached to the corner portion of the lower surface of the housing of the battery pack.

The strain gauge 6 may be attached to two or more locations from among the center portion, the end portion, and the corner portion of the upper surface and/or lower surface of the housing of the battery pack. Additionally, instead of the strain gauge 6, the sensor 6A illustrated in FIG. 9 and FIG. 10, the sensor 6B illustrated in FIG. 11 and FIG. 12, the sensor 6C illustrated in FIG. 13, the sensor 6D illustrated in FIG. 13, and the sensor 6D illustrated in FIG. 14 may be used for any of the center portion, the end portion, and the corner portion of the upper surface and/or lower surface of the housing of the battery pack. In this case, the same effect described above is obtained.

Although the preferred embodiments have been described in detail above, the invention is not limited to these embodiments. Various modifications and substitutions can be made to the above-described embodiments without departing from the scope of the claims.

For example, the strain gauge is not limited to the form illustrated in FIG. 2 or other drawings. For example, a strain gauge in which multiple resistors formed linearly on one side of the substrate are provided and respective resistors intersect to be conductive with one another on the same plane may be used. More specifically, a strain gauge in which two resistors formed linearly on one side of the substrate are provided and two resistors intersect perpendicular to each other to be conductive on the same plane may be used. Alternatively, a strain gauge in which three or more resistors formed linearly on one side of the substrate are provided and the respective resistors intersect to be conductive with one another such that the angles formed by the resistors on the same plane are 45 degrees may be used. Thereby, strains in multiple directions can be selectively measured.

In the sensor 6B, an example in which the resistive portion 31B is provided on the upper surface 10a of the substrate 10 being an insulating layer and the resistive portion 32B is provided on the lower surface 10b of the substrate 10 is described. However, the sensor is not limited to this as long as the sensor has a structure in which the resistive portion 31B is provided on one side of the insulating layer and the resistive portion 32B is provided on the other side of the insulating layer. For example, the resistive portion 31B may be provided on the upper surface 10a of the substrate 10, an insulating layer may be provided on the upper surface 10a of the substrate 10 to cover the resistive portion 31B, and the resistive portion 32B may be provided on the insulating layer. Alternatively, a first substrate on which the resistive portion 31B is provided and a second substrate on which the resistive portion 32B is provided may be fabricated, and then the first substrate on which the resistive portion 31B is provided and the second substrate on which the resistive portion 32B is provided may be bonded together such that the resistive portion 31B and resistive portion 32B face inward and an insulating layer is interposed between the first substrate and the second substrate. Alternatively, the first substrate on which the resistive portion 31B is provided and the second substrate on which the resistive portion 32B is provided are fabricated, and then the first substrate on which the resistive portion 31B is provided and the second substrate on which the resistive portion 32B is provided may be laminated in the same direction. The same configurations described above may be applied to the sensor 6C.

This International Application claims priority to Japanese Patent Application No. 2018-159658, filed Aug. 28, 2018, and Japanese Patent Application No. 2018-239997, filed Dec. 21, 2018, the contents of which are incorporated herein by reference in their entirety.

REFERENCE SIGNS LIST 1, 1A, 1B, 10, 1D battery pack, 2 housing, 2A lower member, 2B upper member, 2C cutout part, 3 battery, 4 circuit board, 5 external output terminal, 6 strain gauge, 6A, 6B, 6C, 6D sensor, 61 temperature detecting unit, 7, 7A analog front end section, 8 controller, 9, 9D seal portion, 10 substrate, 10a upper surface of substrate, 10b lower surface of substrate, 20 functional layer, 30, 30B, 30C resistor, 30D, 42D, 43 metal layer, 31B, 31C, 32B, 32C resistive portion, 41B, 42B, 41D terminal section, 50 separate sensor, 60 cover layer, 65 moisture-proof layer

The invention claimed is:

1. A battery pack comprising:
a battery;
a sensor configured to detect a state of the battery;
wherein the sensor includes an insulating layer, a functional layer formed of a metal, an alloy, or a metal compound, and a resistor formed of a film including Cr, CrN, and Cr2N, the functional layer being formed directly on one side of the insulating layer, and the resistor being formed directly on one side of the functional layer, wherein the sensor detects the state of the battery as a change in a resistance value of the resistor, wherein the resistor has alpha-chromium as a main component, and wherein the functional layer has a function of promoting crystal growth of the alpha-chromium to deposit a film having the alpha-chromium as a main component.

2. The battery pack as claimed in claim 1, wherein the battery is a plurality of batteries, the plurality of batteries being arrayed, and wherein the sensor is a plurality of sensors, the plurality of sensors being respectively assigned to the plurality of batteries.

3. The battery pack as claimed in claim 2, wherein the plurality of sensors respectively assigned to the plurality of batteries are arrayed on one side of the same insulating layer.

4. The battery pack as claimed in claim 1, wherein the resistor further comprises a plurality of first resistive portions arranged side by side on one side of the insulating layer, a longitudinal direction of the plurality of first resistive portions being directed to a first direction, and a plurality of second resistive portions arranged side by side on another side of the insulating layer, a longitudinal direction of the plurality of second resistive portions being directed to a second direction intersecting with the first direction.

5. The battery pack as claimed in claim 1, wherein the resistor includes the alpha-chromium at 80% by weight or more.

6. The battery pack as claimed in claim 1, wherein the resistor is formed in a zigzag pattern.

7. The battery pack as claimed in claim 1, comprising a housing that accommodates the battery, wherein the sensor is attached to the housing.

8. The battery pack as claimed in claim 7, wherein the sensor is attached to a central portion of an upper surface of the housing and/or a central portion of a lower surface of the housing.

9. The battery pack as claimed in claim 7, wherein the sensor is attached to an end portion of an upper surface of the housing and/or an end portion of a lower surface of the housing.

10. The battery pack as claimed in claim 7, wherein the sensor is attached to a corner portion of an upper surface of the housing and/or a corner portion of a lower surface of the housing.

11. The battery pack as claimed in claim 7, wherein the housing includes a sealing portion that seals an external output terminal, and wherein the sensor is attached to the sealing portion.

12. The battery pack as claimed in claim 1, comprising:

a circuit board on which an electronic component is implemented; and a housing that accommodates the battery, wherein the sensor is attached to the circuit board and is hermetically sealed together with the electronic component.

13. The battery pack as claimed in claim 1, comprising a temperature sensor configured to obtain temperature information of the battery.

* * * * *